(12) United States Patent
Zhang et al.

(10) Patent No.: US 12,342,185 B2
(45) Date of Patent: Jun. 24, 2025

(54) SPATIAL MULTIPLEXING METHOD AND APPARATUS, COMPUTER-READABLE STORAGE MEDIUM, AND CHIP

(71) Applicant: HUAWEI TECHNOLOGIES CO., LTD., GuangDong (CN)

(72) Inventors: Meihong Zhang, Shenzhen (CN); Xiangwen Guo, Chengdu (CN); Xiao Han, Shenzhen (CN); Jiahui Zhang, Chengdu (CN); Rui Du, Shenzhen (CN); Chenchen Liu, Shenzhen (CN); Yan Long, Chengdu (CN); Yingxiang Sun, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 404 days.

(21) Appl. No.: 17/951,519

(22) Filed: Sep. 23, 2022

(65) Prior Publication Data
US 2023/0016889 A1 Jan. 19, 2023

Related U.S. Application Data

(63) Continuation of application No. PCT/CN2021/080559, filed on Mar. 12, 2021.

(30) Foreign Application Priority Data

Mar. 26, 2020 (CN) .......................... 202010223691.7

(51) Int. Cl.
*H04W 72/542* (2023.01)
*H04W 16/28* (2009.01)
(Continued)

(52) U.S. Cl.
CPC ........... *H04W 16/28* (2013.01); *H04W 24/10* (2013.01); *H04W 84/12* (2013.01)

(58) Field of Classification Search
CPC ..... H04W 16/28; H04W 24/10; H04W 84/12; H04W 72/54; H04B 7/0632
See application file for complete search history.

(56) References Cited

U.S. PATENT DOCUMENTS 10,771,997 B2 * 9/2020 Cordeiro .............. H04B 7/0617
11,206,549 B1 * 12/2021 Eyuboglu ......... H04W 72/1273
(Continued)

FOREIGN PATENT DOCUMENTS

CN 103152760 A 6/2013
CN 107396397 A 11/2017
(Continued)

OTHER PUBLICATIONS

3GPP TSG-RAN WG2#103 Meeting, R1-1811796 Title: Beamforming related issues for NR-Unlicensed SI (Year: 2018).*
(Continued)

*Primary Examiner* — Faruk Hamza
*Assistant Examiner* — Abusayeed M Haque
(74) *Attorney, Agent, or Firm* — Rimon PC

(57) ABSTRACT

A spatial multiplexing method and apparatus are provided to introduce WLAN sensing into a conventional spatial multiplexing mechanism and improve communication efficiency. In the method an AP sends a first request message to a first station and a second station, to request to measure channel quality in one or more sensing beam directions in a first SP; the AP sends a second request message to a third station and a fourth station, to request to measure channel quality in a communications beam direction in a second SP; the first station, the second station, the third station, and the fourth station separately perform measurement and report respective first measurement results; and the AP receives the first measurement results of the stations, and determines,
(Continued)

based on the first measurement results, whether to perform spatial multiplexing on the first SP and the second SP.

20 Claims, 13 Drawing Sheets

(51) Int. Cl.
    *H04W 24/10*     (2009.01)
    *H04W 72/044*     (2023.01)
    *H04W 72/54*     (2023.01)
    *H04W 84/12*     (2009.01)

(56) References Cited

U.S. PATENT DOCUMENTS

| | | | |
|---|---|---|---|
| 11,271,699 B1* | 3/2022 | Eyuboglu | H04L 1/1819 |
| 2015/0092673 A1 | 4/2015 | Singh et al. | |
| 2019/0037530 A1* | 1/2019 | Han | H04W 16/28 |
| 2019/0200337 A1* | 6/2019 | Zhou | H04L 5/0055 |
| 2019/0373502 A1* | 12/2019 | Chae | H04W 28/0284 |
| 2020/0267711 A1* | 8/2020 | Josan | H04W 24/10 |
| 2021/0194608 A1* | 6/2021 | Yao | H04B 1/10 |

FOREIGN PATENT DOCUMENTS

| | | |
|---|---|---|
| WO | 2014032717 A1 | 3/2014 |
| WO | 2017217898 A1 | 12/2017 |

OTHER PUBLICATIONS

3GPP TSG-RAN WG2#99, R2-1708585 Title: Beamforming impact on Random Access (and initial access) (Year: 2017).*

IEEE 802.11-16/0295r2, Lei Huang et al., "Spatial Sharing Enhancement for MIMO Operation,", Mar. 2016; 9 total pages.

IEEE 802.11-16/0672r2, Kyungtae Jo et al, "Multi-Channel Spatial Sharing for 11ay," May 2016; 11 total pages.

IEEE 802.11-16/1132r0, Lei Huang et al, "An Update on Spatial Sharing Enhancement for MIMO Operation," Sep. 2016; 9 total pages.

IEEE Std 802.11ad, "IEEE Standard for Information technology—Telecommunications and information exchange between systems—Local and metropolitan area networks—Specific requirements, Part 11: Wireless LAN Medium Access Control (MAC) and Physical Layer (PHY) Specifications, Amendment 3: Enhancements for Very High Throughput in the 60 GHz Band," Dec. 28, 2012; 628 total pages.

IEEE P802.11ay/D4.0, "Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 2: Enhanced throughput for operation in license-exempt bands above 45 GHZ," Jun. 2019; 791 total pages.

* cited by examiner

| Operating class | Channel number | Association identifier | Reserved bit | Measurement method |
|---|---|---|---|---|
Octets: 1 1 1 1 1

| Measurement start time | Measurement duration | Quantity of time blocks | Optional subelements |
|---|---|---|---|
Octets: 8 2 1 Variable

FIG. 6

| Octets: | Measurement start time | Measurement duration | Operating class | Channel number | Association identifier | Reserved bit | Measurement method |
|---|---|---|---|---|---|---|---|
| | 8 | 2 | 1 | 1 | 1 | 1 | 1 |

| Octets: | Quantity of time blocks | Measurement result of a time block 1 | ... | Measurement result of a time block N | Optional subelements |
|---|---|---|---|---|---|
| | 1 | 1 | | 1 | Variable |

FIG. 8

SPATIAL MULTIPLEXING METHOD AND APPARATUS, COMPUTER-READABLE STORAGE MEDIUM, AND CHIP

CROSS-REFERENCE TO RELATED APPLICATION

This application is a continuation of International Application No. PCT/CN2021/080559, filed on Mar. 12, 2021, which claims priority to Chinese Patent Application No. 202010223691.7, filed on Mar. 26, 2020. The disclosures of the aforementioned applications are hereby incorporated by reference in their entireties.

TECHNICAL FIELD

This application relates to the communications field, and in particular, to a spatial multiplexing method and apparatus, a computer-readable storage medium, and a chip.

BACKGROUND

The Institute of Electrical and Electronics Engineers (IEEE) 802.11ad/ay is one of standards for millimeter-wave wireless local area network communication. A millimeter-wave band has wide bandwidth, and can implement an extremely high communications rate. However, the channel attenuation of millimeter-wave signals is severe and the path loss is large. Therefore, signal attenuation in a transmission process can be compensated for by using a directional beamforming (BF) technology in millimeter-wave communications. A narrow beam formed through beamforming has good directivity and an anti-interference capability, and interference between adjacent links can be reduced. This feature can be used to perform spatial multiplexing, to improve network capacity. Spatial multiplexing means that different links in the same space communicate with each other on a same channel without interfering with each other. The spatial multiplexing can further improve resource utilization and increase network capacity.

Wireless local area network (WLAN) sensing is a new technology that allows a wireless device to behave like a bistatic radar system and use an existing wireless signal for motion detection. For example, determining may be performed in the WLAN sensing by using feedback information generated by an existing wireless network, to control a status in a corresponding function, for example, energy management, home monitoring, and user wakeup/sleep gesture recognition. An advantage of the WLAN sensing technology is that the WLAN sensing technology is based on pre-existing standards, hardware, infrastructure, and wireless deployment. Although existing sensors on the market can also provide environmental control feedback, the sensors need to be installed specifically. An existing wireless network can be used to generate the same feedback through the WLAN sensing, and there is no need to build and maintain a plurality of systems. The WLAN sensing can be used to locate objects, detect human presence, recognize human actions, provide care for the elderly, and detect biological feature anomalies. Use of the WLAN sensing in a WLAN can fully use existing network resources, with lower costs.

How to introduce the WLAN sensing into a conventional spatial multiplexing mechanism is an urgent problem to be resolved.

SUMMARY

This specification provides a spatial multiplexing method and apparatus, a computer-readable storage medium, and a chip, to introduce WLAN sensing into a conventional spatial multiplexing mechanism to improve communication efficiency.

According to a first aspect, a spatial multiplexing method is provided, including: A first station receives a first request message from an access point, where the first request message is used to request to measure channel quality in one or more sensing beam directions in a first service period SP; the first station performs a measurement in the one or more sensing beam directions in the first SP based on the first request message, to obtain a first measurement result, where the first SP is an SP of at least one operation of communication and wireless local area network WLAN sensing performed by a third station and a fourth station; and the first station sends the first measurement result to the access point.

According to the spatial multiplexing method in this embodiment of this application, spatial multiplexing in IEEE 802.11ad/ay is combined with the WLAN sensing. In other words, the WLAN sensing is introduced into a conventional spatial multiplexing mechanism, to improve communication efficiency and network compatibility and extensibility. The WLAN sensing is performed without affecting normal communication. This helps implement, during communication, WLAN sensing functions such as object positioning, human presence detection, and human action recognition.

It should be understood that the first station performs a measurement in the one or more sensing beam directions in the first SP may mean that the first station senses in the one or more sensing beam directions, to learn interference of the WLAN sensing performed by the third station and the fourth station on the first station, namely, the first measurement result of the first station.

The first measurement result may be a measurement result of an average noise plus interference power indicator (ANIPI), a measurement result of a received signal-to-noise indicator (RSNI), or a measurement result of another indicator. This is not limited in this embodiment of this application. In this embodiment of this application, the access point may determine to perform spatial multiplexing on the first SP and a second SP only when the first measurement results of the four stations all meet a preset condition. Otherwise, the access point determines not to perform spatial multiplexing on the first SP and the second SP.

With reference to the first aspect, in some implementations of the first aspect, the first request message is further used to request to measure channel quality in a communications beam direction in the first SP; and that the first station performs a measurement in the one or more sensing beam directions in the first SP based on the first request message, to obtain a first measurement result includes: The first station performs a measurement in the one or more sensing beam directions and the communications beam direction in the first SP based on the first request message, to obtain the first measurement result.

In other words, the first SP is used by both the third station and the fourth station for communication and the WLAN sensing. The first station and the second station not only need to measure channel quality of a sensing beam in the first SP, but also need to measure channel quality of a communications beam in the first SP. Therefore, the first request message sent by the access point to the first station is not only used to request to measure the channel quality in the one or more sensing beam directions in the first SP, but also used to request to measure the channel quality in the communications beam direction in the first SP, that is, to measure the channel quality of both the sensing beam and the communications beam in the first SP.

With reference to the first aspect, in some implementations of the first aspect, the first request message includes a first field, and a value of the first field is a reserved value indicating to measure the channel quality in both the sensing beam direction and the communications beam direction.

In a possible implementation, the first request message may be a directional channel quality request frame, and the first field may be a measurement method field in the first request message. For example, an existing directional channel quality request frame may be used as the first request message. In an existing protocol, a value of a measurement method field in the directional channel quality request frame is only from 0 to 3, and another value is a reserved value. In this application, four reserved values (from 4 to 7) are selected to indicate a station receiving the first request message to measure the channel quality in both the sensing beam direction and the communications beam direction.

In addition, the first request message may be of another frame structure, and another existing field in the first request message may be reused as the first field, or the first field may be a newly added field in the first request message. This is not limited in this embodiment of this application either.

In this embodiment of this application, a directional channel quality request frame in a conventional spatial multiplexing mechanism is reused. This implements a function of measuring the channel quality in both the sensing beam direction and the communications beam direction, and helps simplify a frame structure, reduce signaling overheads, and improve system transmission performance.

With reference to the first aspect, in some implementations of the first aspect, the first request message includes at least one of a second field and a third field, the second field indicates the first station to measure channel quality in all sensing beam directions or measure channel quality in a specified sensing beam direction, and the third field indicates the first station to feed back all values, an average value, a maximum value, or a minimum value of the measurement results of the sensing beams.

It should be understood that "the first station feeds back all values, an average value, a maximum value, or a minimum value of the measurement results of the sensing beams" indicated by the third field is specific to a sensing beam indicated by the second field. In other words, if the second field indicates the first station to measure the channel quality in all the sensing beam directions, "sensing beams" in the third field are all the sensing beams. If the second field indicates the first station to measure the channel quality in the specified sensing beam direction, the specified sensing beam may be one or more sensing beams, and the "sensing beam" in the third field is the one or more sensing beams. It should be further understood that if the specified sensing beam is one sensing beam, the third field indicates the first station to feed back a measurement result of the sensing beam. In this case, there is no average value, maximum value, or minimum value of the measurement results of the sensing beam.

For example, a value 0 of the second field indicates the station receiving the first request message to perform measurement in all the sensing beam directions; a value 1 of the second field indicates the station receiving the first request message to perform measurement in the specified sensing beam direction; a value 2 of the second field indicates that the station receiving the first request message may select a sensing beam and perform measurement in a corresponding sensing beam direction; and a value 3 of the second field indicates the reserved value.

With reference to the foregoing example, in a possible implementation, the first request message is used to request to measure the ANIPI. In this case, a value of the third field may be 2, to indicate to the station receiving the first request message to feed back a maximum value of measurement results of all the sensing beams. SP spatial multiplexing cannot be performed provided that a measurement result of an ANIPI of one sensing beam is greater than a first threshold, and the SP spatial multiplexing can be performed only when measurement results of ANIPIs of all the sensing beams are less than the first threshold.

With reference to the foregoing example, in another possible implementation, the first request message is used to request to measure the RSNI. In this case, a value of the third field may be 3, to indicate to the station receiving the first request message to feed back a minimum value of measurement results of all the sensing beams. SP spatial multiplexing cannot be performed provided that a measurement result of an RSNI of one sensing beam is less than a second threshold, and the SP spatial multiplexing can be performed only when measurement results of RSNIs of all the sensing beams are greater than the second threshold.

With reference to the first aspect, in some implementations of the first aspect, the second field indicates the first station to measure the channel quality in the specified sensing beam direction, the first request message further includes a fourth field, and the fourth field indicates the specified sensing beam.

With reference to the first aspect, in some implementations of the first aspect, the first measurement result includes a fifth field, and the fifth field indicates a measurement result in at least one of the one or more sensing beam directions, or an average value, a maximum value, or a minimum value of measurement results in the one or more sensing beam directions.

It should be understood that specific content of the fifth field depends on the value of the third field. If the value of the third field indicates to feed back measurement results of one or more sensing beams (for example, all the sensing beams), the fifth field feeds back the measurement results of the one or more sensing beams. If the value of the third field indicates to feed back an average value, the maximum value, or the minimum value of the measurement results of all the sensing beams, the fifth field feeds back the average value, the maximum value, or the minimum value of the measurement results of all the sensing beams.

In a possible implementation, the first measurement result may be a directional channel quality report frame. Optionally, a reserved value may be selected from an optional subelements field in the directional channel quality report frame to indicate a newly added subelement. The newly added subelement is the fifth field, and indicates a WLAN sensing measurement result, for example, a single-beam sensing measurement result or a multi-beam sensing measurement result.

In this application, a directional channel quality report frame in the conventional spatial multiplexing mechanism is reused. This implements the function of measuring the channel quality in both the sensing beam direction and the communications beam direction, and helps simplify the frame structure, reduce the signaling overheads, and improve the system transmission performance.

With reference to the first aspect, in some implementations of the first aspect, the method further includes: The first station receives a first message from the access point, where the first message indicates to perform spatial multiplexing on the first SP and a second SP.

With reference to the first aspect, in some implementations of the first aspect, the first message further indicates that the second SP is used by the first station to perform WLAN sensing with the second station.

It should be understood that, when determining, based on first measurement results of stations, to perform spatial multiplexing on the first SP and the second SP, the access point may determine whether at least one of the first SP and the second SP is used for WLAN sensing between stations. In other words, for example, the first station and the second station measure both the channel quality of the one or more sensing beams and the channel quality of the communications beam in the first SP. If the channel quality of the sensing beam does not meet a multiplexing condition, but the channel quality of the communications beam meets the multiplexing condition, and channel quality of communications beams of the third station and the fourth station also meets the multiplexing condition, the access point may perform spatial multiplexing on the first SP and the second SP. However, the first station and the second station are allowed to only perform communication in the spatial multiplexing process, and the first station and the second station are not allowed to perform WLAN sensing in the spatial multiplexing process. If both the channel quality of the sensing beam and the channel quality of the communications beam that are of the first station and the second station meet the multiplexing condition, and the channel quality of the communications beams of the third station and the fourth station also meets the multiplexing condition, the access point may allow the first station and the second station to perform communication and WLAN sensing in the spatial multiplexing phase while performing spatial multiplexing on the first SP and the second SP.

With reference to the first aspect, in some implementations of the first aspect, the first message further indicates at least one of the first station and the second station to perform WLAN sensing in all the sensing beam directions in the second SP, or at least one of the first station and the second station to perform WLAN sensing in the specified sensing beam direction in the second SP.

For example, the first message may be an extended schedule element frame. In a possible implementation, an allocation type field in an allocation control field in the extended schedule element frame may indicate that an SP scheduled by the current extended schedule element frame is used for the WLAN sensing. In another possible implementation, an indication field may be added to the allocation control field, to indicate that an SP scheduled by the current extended schedule element frame is used for the WLAN sensing.

With reference to the first aspect, in some implementations of the first aspect, the first message indicates at least one of the following: The first station performs WLAN sensing in the specified sensing beam direction in the second SP, where the first message further indicates a specified sensing beam corresponding to the first station; and the second station performs WLAN sensing in the specified sensing beam direction in the second SP, where the first message further indicates a specified sensing beam corresponding to the second station.

Optionally, the first message may be an extended schedule element frame. A field may be added to the extended schedule element frame to indicate whether a sensing beam direction of a station during the WLAN sensing is directional or omnidirectional.

With reference to the first aspect, in some implementations of the first aspect, the first station is a receiver of the WLAN sensing, and during the spatial multiplexing performed on the first SP and the second SP, the method further includes: The first station receives a third request message from the access point, where the third request message is used to request to measure channel quality in the one or more sensing beam directions in the second SP; the first station performs signal measurement in the one or more sensing beam directions in the second SP based on the third request message, to obtain a second measurement result; and the first station sends the second measurement result to the access point.

According to a second aspect, another spatial multiplexing method is provided, including: An access point sends a first request message to a first station and a second station, where the first request message is used to request to measure channel quality in one or more sensing beam directions in a first service period SP; the access point sends a second request message to a third station and a fourth station, where the second request message is used to request to measure channel quality in a communications beam direction in a second SP, the first SP is at least used by the third station to communicate with the fourth station, and the second SP is at least used by the first station and the second station to perform wireless local area network WLAN sensing; the access point separately receives a first measurement result from the first station, the second station, the third station, and the fourth station; and the access point determines, based on the first measurement result, whether to perform spatial multiplexing on the first SP and the second SP.

With reference to the second aspect, in some implementations of the second aspect, the first SP is further used by the third station to communicate with the fourth station, and the first request message is further used to request to measure channel quality in a communications beam direction in the first SP.

With reference to the second aspect, in some implementations of the second aspect, the first request message includes a first field, and a value of the first field is a reserved value indicating to measure the channel quality in both the sensing beam direction and the communications beam direction.

With reference to the second aspect, in some implementations of the second aspect, the first request message includes at least one of a second field and a third field, the second field indicates to measure channel quality in all sensing beam directions or measure channel quality in a specified sensing beam direction, and the third field indicates to feed back all values, an average value, a maximum value, or a minimum value of the measurement results of the sensing beams.

With reference to the second aspect, in some implementations of the second aspect, the second field indicates to measure the channel quality in the specified sensing beam direction, the first request message further includes a fourth field, and the fourth field indicates the specified sensing beam.

With reference to the second aspect, in some implementations of the second aspect, the first measurement result fed back by the first station and the second station includes a fifth field, and the fifth field indicates a measurement result in each of the one or more sensing beam directions, or an average value, a maximum value, or a minimum value of measurement results in the one or more sensing beam directions.

With reference to the second aspect, in some implementations of the second aspect, the method further includes: The access point sends a first message, where the first message indicates to perform spatial multiplexing on the first SP and the second SP.

With reference to the second aspect, in some implementations of the second aspect, the first message further indicates that the second SP is used by the first station to perform WLAN sensing with the second station.

With reference to the second aspect, in some implementations of the second aspect, the first message further indicates at least one of the first station and the second station to perform WLAN sensing in all the sensing beam directions in the second SP, or at least one of the first station and the second station to perform WLAN sensing in the specified sensing beam direction in the second SP.

With reference to the second aspect, in some implementations of the second aspect, the first message indicates at least one of the following: The first station performs WLAN sensing in the specified sensing beam direction in the second SP, where the first message further indicates a specified sensing beam corresponding to the first station; and the second station performs WLAN sensing in the specified sensing beam direction in the second SP, where the first message further indicates a specified sensing beam corresponding to the second station.

With reference to the second aspect, in some implementations of the second aspect, the first station is a receiver of the WLAN sensing, and during the spatial multiplexing performed on the first SP and the second SP, the method further includes: The access point sends a third request message to the first station, where the third request message is used to request to measure channel quality in the one or more sensing beam directions in the second SP; the access point sends a fourth request message to the third station and the fourth station, where the fourth request message is used to request to measure the channel quality in the communications beam direction in the first SP; the access point separately receives a second measurement result from the first station, the third station, and the fourth station; and the access point determines, based on the second measurement result, whether to continue to perform spatial multiplexing on the first SP and the second SP.

According to a third aspect, another spatial multiplexing method is provided, including: An access point sends a first request message to a first station and a second station, where the first request message is used to request to measure channel quality in one or more sensing beam directions in a first service period SP; the access point sends a fifth request message to a third station and a fourth station, where the fifth request message is used to request to measure channel quality in one or more sensing beam directions in a second SP, the first SP is at least used by the third station and the fourth station to perform wireless local area network WLAN sensing, and the second SP is at least used by the first station and the second station to perform WLAN sensing; the access point separately receives a first measurement result from the first station, the second station, the third station, and the fourth station; and the access point determines, based on the first measurement result, whether to perform spatial multiplexing on the first SP and the second SP.

In the third aspect, the fifth request message is similar to the first request message, and a difference lies only in that an SP corresponding to the fifth request message is different from an SP corresponding to the first request message. For specific description of the first request message and the first measurement result, refer to the second aspect. Details are not described herein again.

According to a fourth aspect, a spatial multiplexing apparatus is provided, configured to perform the method in any possible implementation of the foregoing aspects. Specifically, the apparatus includes a unit configured to perform the method in any possible implementation of the foregoing aspects.

According to a fifth aspect, a spatial multiplexing apparatus is provided. The apparatus includes a processor. The processor is coupled to a memory, and may be configured to execute instructions in the memory, to implement the method in any possible implementation of the foregoing aspects. Optionally, the spatial multiplexing apparatus further includes the memory. Optionally, the communications apparatus further includes a communications interface, and the processor is coupled to the communications interface.

In an implementation, the spatial multiplexing apparatus is a station. When the spatial multiplexing apparatus is a station, the communications interface may be a transceiver or an input/output interface.

In another implementation, the spatial multiplexing apparatus is a chip configured in a station. When the spatial multiplexing apparatus is a chip configured in a station, the communications interface may be an input/output interface.

In an implementation, the spatial multiplexing apparatus is an access point. When the spatial multiplexing apparatus is an access point, the communications interface may be a transceiver or an input/output interface.

In another implementation, the spatial multiplexing apparatus is a chip configured in an access point. When the spatial multiplexing apparatus is a chip configured in an access point, the communications interface may be an input/output interface.

According to a sixth aspect, a processor is provided, including an input circuit, an output circuit, and a processing circuit. The processing circuit is configured to: receive a signal through the input circuit, and transmit a signal through the output circuit, to enable the processor to perform the method in any possible implementation of the foregoing aspects.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in embodiments of this application.

According to a seventh aspect, a processing apparatus is provided, including a processor and a memory. The processor is configured to: read instructions stored in the memory, receive a signal through a receiver, and transmit a signal through a transmitter, to perform the method in any possible implementation of the foregoing aspects.

Optionally, there are one or more processors, and there are one or more memories.

Optionally, the memory may be integrated with the processor, or the memory and the processor are separately disposed.

In a specific implementation process, the memory may be a non-transitory memory, such as a read-only memory (ROM). The memory and the processor may be integrated into a same chip, or may be separately disposed on different chips. A type of the memory and a manner of disposing the memory and the processor are not limited in embodiments of this application.

It should be understood that, a related data exchange process such as sending of indication information may be a process of outputting the indication information from the processor, and receiving of capability information may be a process of receiving the input capability information by the processor. Specifically, data output by the processor may be output to a transmitter, and input data received by the processor may be from a receiver. The transmitter and the receiver may be collectively referred to as a transceiver.

The processing apparatus in the seventh aspect may be a chip. The processor may be implemented by using hardware, or may be implemented by using software. When the processor is implemented by using the hardware, the processor may be a logic circuit, an integrated circuit, or the like; or when the processor is implemented by using the software, the processor may be a general-purpose processor, and is implemented by reading software code stored in the memory. The memory may be integrated into the processor, may be located outside the processor, and may exist independently.

According to an eighth aspect, a computer program product is provided. The computer program product includes a computer program (which may also be referred to as code or instructions). When the computer program is run, a computer is enabled to perform the method in any possible implementation of the foregoing aspects.

According to a ninth aspect, a computer-readable storage medium is provided. The computer-readable storage medium stores a computer program (which may also be referred to as code or instructions). When the computer program runs on a computer, the computer is enabled to perform the method in any possible implementation of the foregoing aspects.

According to a tenth aspect, a communications system is provided, including the foregoing station and the foregoing access point.

BRIEF DESCRIPTION OF DRAWINGS

FIG. 6 is a schematic diagram of a frame structure of a first request message according to an embodiment of this application;

FIG. 8 is a schematic diagram of a frame structure of a first measurement result according to an embodiment of this application;

DESCRIPTION OF EMBODIMENTS

Figure 1:
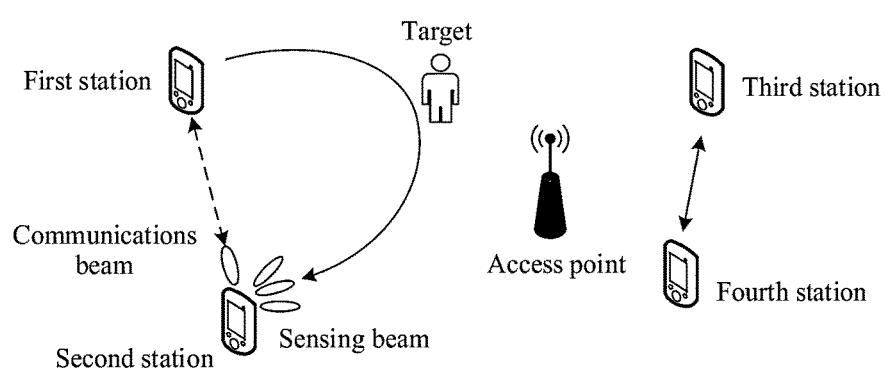
FIG. 1 is a schematic diagram of a communications system according to an embodiment of this application.

The following describes technical solutions of this application with reference to accompanying drawings.

The technical solutions in embodiments of this application may be applied to various communications systems, for example, a wireless local area network (WLAN) communications system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a 5th generation (5G) system, new radio (NR), or the like.

For example, the following describes an application scenario in embodiments of this application and a method in embodiments of this application by using a WLAN system as an example.

Specifically, embodiments of this application may be applied to a wireless local area network (WLAN), and embodiments of this application may be applied to any protocol in the IEEE 802.11 series protocols currently used by the WLAN, and in particular, are applicable to a WLAN system of the 802.11ad standard, the 802.11ay standard, and a subsequent improved standard of the 802.11ay standard. The WLAN may include one or more basic service sets (BSS). A network node in the basic service set may include an access point (AP) and a station (STA). In this application, the AP may also be replaced with a personal basic service set control point (PCP). The following uses only the AP as an example for description.

Specifically, the station (STA) in embodiments of this application may also be referred to as a system, a subscriber unit, an access terminal, a mobile station, a remote station, a remote terminal, a mobile device, a user terminal, a terminal, a wireless communications device, a user agent, a user apparatus, or user equipment (UE). The STA may be a cellular phone, a cordless phone, a session initiation protocol (SIP) phone, a wireless local loop (WLL) station, a personal digital assistant (PDA), a handheld device having a wireless local area network (for example, Wi-Fi) communications function, a wearable device, a computing device, or another processing device connected to a wireless modem. A STA product is usually a terminal product, for example, a mobile phone and a notebook computer, that supports the IEEE 802.11 series standards. The STA may have a single antenna, or may have a plurality of antennas, and may be a device with more than two antennas. For example, the STA may include a physical layer (PHY) processing circuit and a media access control (MAC) processing circuit. The physical layer processing circuit may be configured to process a physical layer signal, and the MAC layer processing circuit may be configured to process a MAC layer signal.

The access point (AP) in embodiments of this application may be configured to communicate with the STA by using a wireless local area network, and data of the STA is transmitted to a network side, or data from a network side is transmitted to the STA. The AP may also be referred to as a wireless access point, a hotspot, or the like. The AP is an access point for a mobile user to access a wired network, and is mainly deployed in homes, buildings, and campuses, or is deployed outdoors. The AP is equivalent to a bridge that connects the wired network and a wireless network. The AP is mainly used to connect wireless network clients to each other, and then connect the wireless network to the Ethernet. Specifically, the AP may be a terminal device or a network device with a wireless fidelity (WiFi) chip. Optionally, the AP may be a device that supports a plurality of WLAN standards such as 802.11. Specifically, the AP may have a plurality of antennas, or may have a single antenna. For example, the AP may include a physical layer (PHY) processing circuit and a media access control (MAC) processing circuit. The physical layer processing circuit may be configured to process a physical layer signal, and the MAC layer processing circuit may be configured to process a MAC layer signal.

For ease of understanding embodiments of this application, a communications system shown in FIG. 1 is first used as an example to describe in detail a communications system applicable to embodiments of this application.

The communications system shown in FIG. 1 may be a WLAN system. The WLAN system in FIG. 1 may include one or more access points and one or more stations. In FIG. 1, one access point and four stations (including a first station, a second station, a third station, and a fourth station) are used as an example.

Wireless communication may be performed between the access point and the station by using various standards. For example, wireless communication may be performed between the access point and the station by using a single-user multiple-input multiple-output (SU-MIMO) technology or a multi-user multiple-input multiple-output (MU-MIMO) technology.

In the communications system shown in FIG. 1, a station may also communicate with another station. As shown in FIG. 1, the first station may communicate with the second station by using a pre-trained communications beam, and the third station may communicate with the fourth station by using a pre-trained communications beam. However, it should be understood that FIG. 1 is merely an example for description, and the first station may alternatively communicate with another station (for example, the third station or the fourth station). This is not limited in this embodiment of this application.

In addition, wireless local area network (WLAN) sensing may be performed between stations. As shown in FIG. 1, WLAN sensing is performed between the first station and the second station. The first station is a signal transmitter, and the second station is a signal receiver. The second station may receive a signal from the first station by using a sensing beam, to detect whether a target object exists. However, it should be understood that the first station may alternatively perform WLAN sensing with another station (for example, the third station or the fourth station). This is not limited in this embodiment of this application.

The foregoing stations may communicate with each other only by using the communications beam, may perform WLAN sensing only by using the sensing beam, or may perform communication by using the communications beam and perform WLAN sensing by using the sensing beam at the same time. This is not limited in this embodiment of this application.

It should be understood that embodiments of this application relate to two types of beams: the communications beam and the sensing beam. The communications beam is used for communication between stations, and is a pair of optimal transmit and receive beams (including a transmit beam of a transmitter and a receive beam of a receiver) obtained by using a beam training process before communication. The sensing beam is used for WLAN sensing between stations, and may include one beam or a plurality of beams.

In embodiments of this application, the access point or the station may include a hardware layer, an operating system layer running on the hardware layer, and an application layer running on the operating system layer. The hardware layer includes hardware such as a central processing unit (CPU), a memory management unit (MMU), and a memory (also referred to as a main memory). The operating system may be any one or more types of computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of the method provided in embodiments of this application is not specially limited in embodiments of this application, provided that a program that records code of the method provided in embodiments of this application can be run to perform communication according to the method provided in embodiments of this application. For example, the method provided in embodiments of this application may be performed by the access point or the station, or a functional module that can invoke and execute the program in the access point or the station.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk or a magnetic tape), an optical disc (for example, a compact disc (CD), a digital versatile disc (DVD), or the like), a smart card and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a wireless channel, and various other media that can store, include, and/or carry instructions and/or data.

For ease of understanding, the following first describes related terms in embodiments of this application.

1. Service Period (SP).

Figure 2:
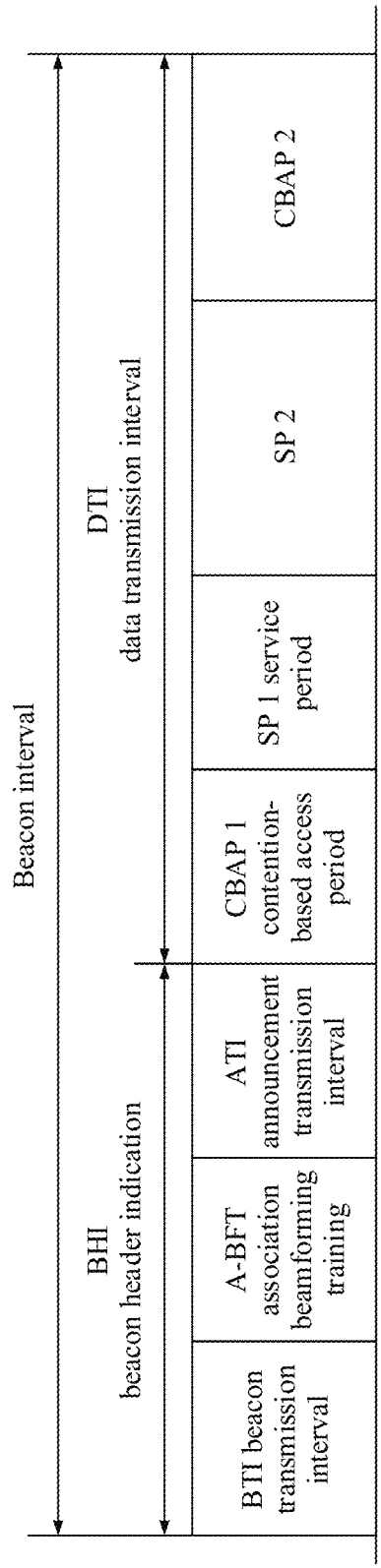
FIG. 2 is a schematic diagram of a structure of a beacon interval according to an embodiment of this application.

The SP is a period or a time period used for scheduling transmission between stations or between a station and an access point. The SP belongs to a beacon interval (BI). FIG. 2 is a schematic diagram of a structure of a BI. As shown in FIG. 2, the beacon interval includes a beacon header indication (BHI) and a data transmission interval (DTI). The BHI further includes a beacon transmission interval (BTI), association beamforming training (A-BFT), and an announcement transmission interval (ATI).

Specifically, the access point sends a plurality of beacon frames in the BTI based on a sector number. The beacon frames are used for downlink sector sweep. The A-BFT is used by a STA for association and uplink sector sweep. The ATI is used by the access point to poll the station for buffered data information and allocate a resource in the data transmission interval (DTI) to the STA. The entire DTI is divided into several subintervals, and the subintervals are divided into a contention-based access period (CBAP) and a service period (SP) based on an access manner. In the service period, scheduling transmission is performed, and contention does not need to be performed.

2. Wlan Sensing.

The WLAN sensing uses wireless signals (such as Wi-Fi and radar signals) to perform ranging, speed measurement, breathing and heartbeat detection, and gesture recognition on a passive object. Frequency bands covered by the WLAN sensing may include both a low frequency (such as IEEE 802.11ac and 802.11be) and a high frequency (IEEE 802.11ad/ay).

Specifically, the WLAN sensing is a new technology that allows a wireless device to behave like a bistatic radar system and use an existing wireless signal for motion detection. For example, determining may be performed in the WLAN sensing by using feedback information generated by an existing wireless network, to control a status in a corresponding function, for example, energy management, home monitoring, and user wakeup/sleep gesture recognition. An advantage of the WLAN sensing technology is that the WLAN sensing technology is based on pre-existing standards, hardware, infrastructure, and wireless deployment. Although existing sensors on the market can also provide environmental control feedback, the sensors need to be installed specifically. An existing wireless network can be used to generate a same feedback through the WLAN sensing, and there is no need to build and maintain a plurality of systems. The WLAN sensing can be used to locate objects, detect human presence, recognize human actions, provide care for the elderly, and detect biological feature anomalies. Use of the WLAN sensing in a WLAN can fully use existing network resources, with no need of a large quantity of costs.

3. Spatial Multiplexing.

The spatial multiplexing in this application refers to spatial multiplexing of SPs, namely, a mechanism in which two or more pairs of SPs that do not interfere with each other are allowed to be multiplexed in space at the same time. In this way, space resource utilization and a system throughput can be increased. In the IEEE 802.11ad/ay standard, different SPs of different stations near a same space are scheduled at the same time, and interference is small. The IEEE 802.11ad/ay standard stipulates that: Before spatial multiplexing is performed, early measurement needs to be performed. Stations feed back measurement results of the stations to an access point, and then the access point determines, based on the measurement result fed back by the station, whether the measurement result meets a spatial multiplexing evaluation criterion. If the measurement result meets the spatial multiplexing evaluation criterion, a corresponding SP is arranged to perform spatial multiplexing in a next BI. If the measurement result does not meet the spatial multiplexing evaluation criterion, the spatial multiplexing is not performed.

Specifically, the standard defines two types of SPs: an existing SP and a candidate SP. The existing SP indicates an SP that has been scheduled and that has a high priority in subsequent spatial multiplexing. The candidate SP indicates an SP on which spatial multiplexing possibility evaluation is to be performed with the existing SP. In subsequent scheduling, the access point no longer allocates dedicated time to the candidate SP, but the candidate SP and the existing SP are multiplexed.

For example, the existing SP is an SP 1, and the candidate SP is an SP 2. It is assumed that the SP 1 is used by a STA A to communicate with a STA B, and the SP 2 is used by a STA C to communicate with a STA D. A specific process of performing spatial multiplexing on the SP 1 and the SP 2 is as follows:

(1) The AP sends a directional channel quality request frame to indicate to the STA C and the STA D to measure channel quality in a communications beam direction in the SP 1, for example, measure an average noise plus interference power indicator (ANIPI) of a channel, to evaluate impact on the STA C and the STA D when the STA A communicates with the STA B.

(2) The AP sends a directional channel quality request frame to indicate to the STA A and the STA B to measure channel quality in a communications beam direction in the SP 2, to evaluate impact on the STA A and the STA B when the STA C communicates with the STA D.

(3) After the measurement is completed, STAs feed back measurement results of the STAs to the AP by using directional channel quality report frames.

(4) After collecting the measurement results of the STAs, the AP determines a status of mutual interference between STAs of two pairs of SPs during communication, and determines whether to perform spatial multiplexing on the SP 1 and the SP 2. If determining to perform spatial multiplexing on the SP 1 and the SP 2, the AP performs time overlapping on the two pairs of SPs during subsequent scheduling. When the spatial multiplexing is performed on the SP 1 and the SP 2 and scheduling is completed, the SP 1 and the SP 2 may be referred to as a pair of SPs. In actual application, two or more pairs of SPs may be used to perform communication at the same time. This is not limited in this embodiment of this application.

In a spatial multiplexing process, the AP may periodically send the directional channel quality request frame to STAs corresponding to all SPs on which the spatial multiplexing is performed, to request the STAs to detect received signal-to-noise indicators (RSNI). The STAs perform measurement and return measurement results of the RSNIs. If the measurement result indicates that signal quality does not meet a requirement, the AP may determine to terminate spatial multiplexing, terminate communication of the STA in the candidate SP, and allow only the STA in the existing SP to continue communication. In other words, the AP may terminate communication between the STA C and the STA D in the SP 2, and allow only communication between the STA A and the STA B in the SP 1.

A spatial multiplexing mechanism specified in the existing IEEE 802.11ad/ay standard may also be referred to as a conventional spatial multiplexing mechanism. In the conventional spatial multiplexing mechanism, in an early measurement phase, measurement is performed on a communications beam between two or more STA pairs, and spatial multiplexing is performed on a communications beam between STA pairs corresponding to a multiplexed SP. Currently, there is no specific method for introducing WLAN sensing into the conventional spatial multiplexing mechanism. After the WLAN sensing is introduced into the conventional spatial multiplexing mechanism, if no indication is provided, a STA that receives the directional channel quality request frame performs a measurement only on a communications beam, and the access point can obtain only interference on the communications beam, but cannot obtain interference on a sensing beam. Consequently, whether an SP used for the WLAN sensing can be multiplexed with another SP cannot be determined. In view of this, embodiments of this application provide a spatial multiplexing method and apparatus, to introduce the WLAN sensing into the conventional spatial multiplexing mechanism and improve communication efficiency.

Before the method provided in embodiments of this application is described, the following descriptions are first provided.

First, in embodiments of this application, "predefined" or "predefinition" may be implemented by pre-storing corresponding code or a corresponding table in a device (for example, a station or an access point) or in another manner that can indicate related information. A specific implementation of "predefined" or "predefinition" is not limited in this application.

Second, in embodiments shown below, terms, English acronyms and abbreviations, and names of frames, fields, and messages, for example, wireless local area network (WLAN) sensing, a directional channel quality request frame, and a directional channel quality report frame, are all examples provided for ease of description, and shall not constitute any limitation on this application. This application does not exclude a possibility of defining another term that can implement a same or similar function in an existing protocol or a future protocol.

Third, "first", "second", and various numbers in embodiments shown below are merely used for differentiation for ease of description, and are not intended to limit the scope of embodiments of this application. For example, different stations are distinguished, different messages are distinguished, and different measurement requests are distinguished.

Fourth, a "protocol" in embodiments of this application may be a standard protocol in the communications field, for example, may include an IEEE 802.11 protocol, a 3GPP protocol, and a related protocol applied to a future communications system. This is not limited in this application.

Fifth, "at least one" means one or more, and "a plurality of" means two or more. "And/or" describes an association relationship between associated objects, and indicates that three relationships may exist. For example, A and/or B may indicate the following cases: Only A exists, both A and B exist, and only B exists, where A and B may be singular or plural. The character "/" generally indicates an "or" relationship between the associated objects. At least one of the following items (pieces) or a similar expression thereof indicates any combination of these items, including a single item (piece) or any combination of a plurality of items. For example, at least one of a, b, and c may indicate a, b, c, a and b, a and c, b and c, or a, b, and c, where a, b, or c may be singular or plural.

With reference to the accompanying drawings, the following describes in detail the spatial multiplexing method and apparatus in this application. It should be understood that the technical solutions in this application may be applied to a wireless communications system, for example, the communications system 100 shown in FIG. 1. There is a wireless communications connection between two communications apparatuses in the wireless communications system. One of the two communications apparatuses may correspond to the access point shown in FIG. 1, for example, may be the access point shown in FIG. 1, or may be a chip disposed in the access point. The other one of the two communications apparatuses may correspond to the station shown in FIG. 1, for example, may be the station shown in FIG. 1, or may be a chip disposed in the station.

Without loss of generality, the following describes in detail the spatial multiplexing method provided in this embodiment of this application by using an interaction process between the access point and the four stations (the first station, the second station, the third station, and the fourth station) as an example.

It should be understood that, in the embodiment of this application, four stations having different roles are listed merely for ease of description. The four stations having different roles do not indicate a quantity of actual stations. For example, the second station and the third station may be a same station, and can not only perform WLAN sensing with the first station, but also communicate with the fourth station. For another example, the first station and the second station may be a same station, and the station performs WLAN sensing by itself, which is applicable to a monostatic radar.

It should be further understood that the first station, the second station, the third station, and the fourth station in this embodiment of this application may be physically independent entities, or may be physically same but logically different functional entities. For example, the second station has a sensing measurement function, and the third station has a communications measurement function. However, the second station and the third station may be physical entities that can perform both communications measurement and sensing measurement.

Figure 3:
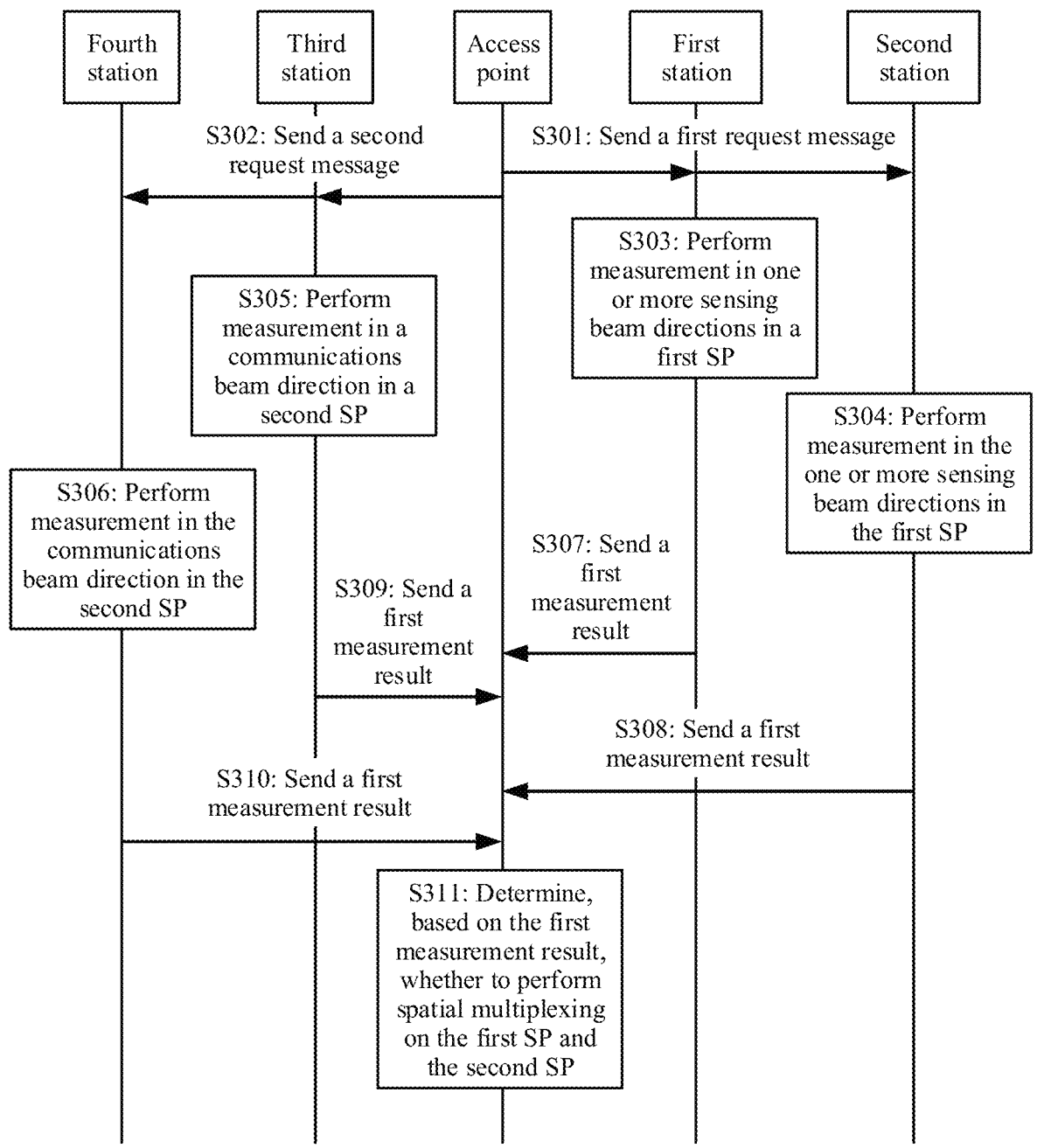
FIG. 3 is a schematic flowchart of a spatial multiplexing method according to an embodiment of this application.

FIG. 3 is a schematic flowchart of a spatial multiplexing method 300 according to an embodiment of this application. The method may be applied to the communications system shown in FIG. 1. This is not limited in this embodiment of this application. The method 300 includes the following steps.

S301: An access point sends a first request message to a first station and a second station, where the first request message is used to request to measure channel quality in one or more sensing beam directions in a first service period SP; and correspondingly, the first station and the second station separately receive the first request message.

S302: The access point sends a second request message to a third station and a fourth station, where the second request message is used to request to measure channel quality in a communications beam direction in a second SP; and correspondingly, the third station and the fourth station separately receive the second request message.

The first SP is at least used by the third station to communicate with the fourth station, and the second SP is at least used by the first station and the second station to perform wireless local area network WLAN sensing.

It should be understood that the first request message sent by the access point to the first station and the first request message sent by the access point to the second station are two independent messages, and specific content may be the same or may be different. In this embodiment of this application, the messages sent by the access point to the first station and the second station are named the same only because the messages sent by the access point to the first station and the second station have a same function and a same frame structure. However, content of the first request message received by the first station and content of the first request message received by the second station are not limited to be completely the same. For example, a quantity of one or more sensing beams indicated in the first request message received by the first station may be the same as or different from a quantity of one or more sensing beams indicated in the first request message received by the second station. The one or more sensing beams indicated in the first request message received by the first station and the one or more sensing beams indicated in the first request message received by the second station may have a same identifier, or may have different identifiers. This is not limited in this embodiment of this application.

Similarly, the second request message sent by the access point to the third station and the second request message sent by the access point to the fourth station are two independent messages, and specific content may be the same or may be different. In this embodiment of this application, the messages sent by the access point to the third station and the fourth station are named the same only because the messages sent by the access point to the third station and the fourth station have a same function and a same frame structure. However, content of the second request message received by the third station and content of the second request message received by the fourth station are not limited to be completely the same.

S303: The first station performs a measurement in the one or more sensing beam directions in the first SP based on the first request message, to obtain a first measurement result.

S304: The second station performs a measurement in the one or more sensing beam directions in the first SP based on the first request message, to obtain a first measurement result.

Figure 4:
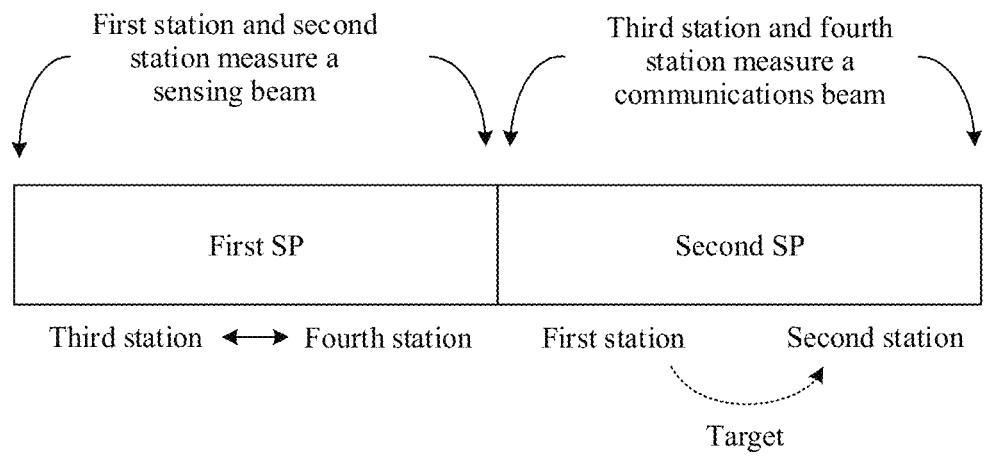
FIG. 4 is a schematic diagram of a relationship between an SP and a station in an early measurement phase according to an embodiment of this application.

FIG. 4 is a schematic diagram of a relationship between an SP and a station in an early measurement phase according to an embodiment of this application. As shown in FIG. 4, when the first station and the second station perform measurement in the sensing beam direction, the third station communicates with the fourth station in the first SP. Optionally, the third station and the fourth station further perform communication and WLAN sensing in the first SP at the same time. That the first station performs a measurement in the one or more sensing beam directions in the first SP may mean that the first station senses in the one or more sensing beam directions, to learn interference of WLAN sensing performed by the third station and the fourth station on the first station, namely, the first measurement result of the first station. Similarly, that the second station performs a measurement in the one or more sensing beam directions in the first SP may mean that the second station senses in the one or more sensing beam directions, to learn interference of WLAN sensing performed by the third station and the fourth station on the second station, namely, the first measurement result of the second station.

S305: The third station performs a measurement in the communications beam direction in the second SP based on the second request message, to obtain a first measurement result.

S306: The fourth station performs a measurement in the communications beam direction in the second SP based on the second request message, to obtain a first measurement result.

It should be understood that there is usually only one communications beam, namely, an optimal receive beam obtained through beam training. As shown in FIG. 4, when the third station and the fourth station perform measurement in the communications beam direction, the first station and the second station perform WLAN sensing in the second SP. Optionally, the first station and the second station further perform communication and WLAN sensing in the second SP at the same time. That the third station performs a measurement in the communications beam direction in the second SP may mean that the first station senses in the communications beam direction, to learn interference of communication performed by the first station and the second station with the third station, namely, the first measurement result of the third station. Similarly, that the fourth station performs a measurement in the communications beam direction in the second SP may mean that the fourth station senses in the communications beam direction, to learn interference of communication performed by the first station and the second station with the fourth station, namely, the first measurement result of the fourth station.

In this embodiment of this application, the first measurement result of the first station, the first measurement result of the second station, the first measurement result of the third station, and the first measurement result of the fourth station exist. It should be understood that the measurement results of the stations may be different. Similar to the first request message and the second request message, in this embodiment of this application, the measurement results obtained by the stations are named the same only because the measurement results obtained by the stations have a same function and a same frame structure. However, content of the first measurement results of the stations is not limited to be completely the same, time and sequences of sending the first measurement results by the stations are not limited either, and correspondingly, time and sequences of receiving the first measurement results of the stations by the access point are not limited either.

S307: The first station sends the first measurement result to the access point, and correspondingly, the access point receives the first measurement result from the first station.

S308: The second station sends the first measurement result to the access point, and correspondingly, the access point receives the first measurement result from the second station.

S309: The third station sends the first measurement result to the access point, and correspondingly, the access point receives the first measurement result from the third station.

S310: The fourth station sends the first measurement result to the access point, and correspondingly, the access point receives the first measurement result from the fourth station.

S311: The access point determines, based on the received first measurement result, whether to perform spatial multiplexing on the first SP and the second SP.

The first measurement result may be a measurement result of an ANIPI, a measurement result of an RSNI, or a measurement result of another indicator. This is not limited in this embodiment of this application.

In this embodiment of this application, in an implementation, the access point may determine to perform spatial multiplexing on the first SP and a second SP only when the first measurement results of the four stations all meet a preset condition. Otherwise, the access point determines not to perform spatial multiplexing on the first SP and the second SP. For example, the first measurement result is the measurement result of the ANIPI, and the preset condition is that the first measurement results of all the stations are less than (or equal to) a first threshold. In other words, when measurement results of ANIPIs of all the stations are less than (or equal to) the first threshold, the access point determines to perform spatial multiplexing on the first SP and the second SP. For example, the first measurement result is the measurement result of the RSNI, and the preset condition is that the first measurement results of all the stations are greater than (or equal to) a second threshold. In other words, when measurement results of RSNIs of all the stations are greater than (or equal to) the second threshold, the access point determines to perform spatial multiplexing on the first SP and the second SP.

According to the spatial multiplexing method in this embodiment of this application, spatial multiplexing in IEEE 802.11ad/ay is combined with the WLAN sensing. In other words, the WLAN sensing is introduced into a conventional spatial multiplexing mechanism, to improve communication efficiency and network compatibility and extensibility. The WLAN sensing is performed without affecting normal communication. This helps implement, during communication, WLAN sensing functions such as object positioning, human presence detection, and human action recognition.

Figure 5:
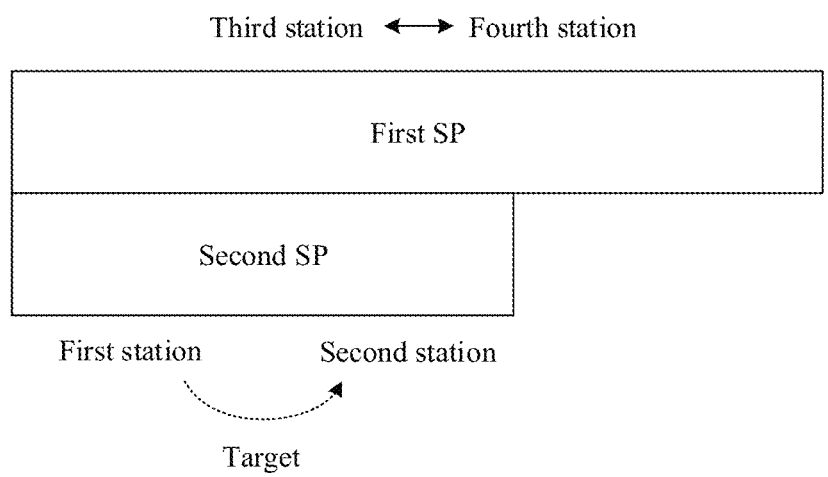
FIG. 5 is a schematic diagram of a relationship between an SP and a station in a spatial multiplexing phase according to an embodiment of this application.

It should be understood that the foregoing S301 to S311 describe only an early measurement process, and this process is a prerequisite for subsequent spatial multiplexing. After determining, by using the early measurement process, to perform spatial multiplexing on the first SP and the second SP, the access point schedules the first SP and the second SP to perform spatial multiplexing, and notifies the stations. FIG. 5 shows a relationship between an SP and a station in a spatial multiplexing phase. As shown in FIG. 5, during spatial multiplexing, a first station and a second station perform WLAN sensing in a second SP, and a third station communicates with a fourth station in a first SP.

In an optional embodiment, the first SP is further used by the third station to communicate with the fourth station, and a first request message is used to request to measure channel quality in a communications beam direction in the first SP.

In other words, the first SP is used by both the third station and the fourth station for communication and the WLAN sensing. The first station and the second station not only need to measure channel quality of a sensing beam in the first SP, but also need to measure channel quality of a communications beam in the first SP. Therefore, the first request message sent by the access point to the first station and the second station is not only used to request to measure channel quality in one or more sensing beam directions in the first SP, but also used to request to measure the channel quality in the communications beam direction in the first SP, that is, to measure the channel quality of both the sensing beam and the communications beam in the first SP.

In an optional embodiment, the first request message includes a first field, and a value of the first field is a reserved value indicating to measure the channel quality in both the sensing beam direction and the communications beam direction.

In a possible implementation, the first request message may be a directional channel quality request frame. A frame structure of the directional channel quality request frame is shown in FIG. 6, and may include the following fields:

(1) An operating class indicates a channel set used in the directional channel quality request, and specifies, together with a channel number field, a channel frequency and an interval used in the directional channel quality request.

(2) A channel number indicates a channel number used in the directional channel quality request.

(3) An association identifier (AID) is an AID allocated to a target station, and the target station may be understood as a station that performs communications measurement with a station receiving the directional channel quality request. For example, the directional channel quality request frame is sent by the AP to a STA A to request the STA A to perform communications measurement with a STA B. Herein, the STA B is the target station, and the AID field in the directional channel quality request frame is an identifier of the STA B. It should be understood that if the first request message requests to perform only sensing measurement between the first station and the second station, that is, to measure only the channel quality of the sensing beam, the AID field may be null, or the station considers that the AID field is meaningless by default. This is not limited in this embodiment of this application.

(4) Reserved bit or reserved bit.

(5) A measurement method indicates a method used by a requested station to perform current measurement and a method for feeding back a measurement result in a measurement report.

(6) Measurement start time.

(7) Measurement duration.

(8) A quantity (number) of time blocks indicates a quantity of time blocks in the foregoing "measurement duration". A ratio of the measurement duration to the quantity of time blocks is duration of a single measurement unit.

(9) Optional subelements may not include a subelement, or may include one or more subelements.

For example, the first field may be the measurement method field in the first request message. For example, Table 1 lists different meanings corresponding to different field values of the first field. As shown in Table 1, in the measurement method field, a field value 0 indicates to measure an ANIPI of a channel in the communications beam direction or the sensing beam direction, and the field is set to the measurement duration, where the measurement duration is measured in one time unit (TU), and a time measurement of the TU is equal to 1024 μs. A field value 1 indicates to measure an RSNI of a channel in the communications beam direction or the sensing beam direction, and the field is set to the measurement duration, where the measurement duration is measured in one TU. A field value 2 indicates to measure an ANIPI of a channel in the communications beam direction or the sensing beam direction, and the field is set to requested measurement duration, where the measurement duration is measured in 1 μs (TU/1024). A field value 3 indicates to measure an RSNI of a channel in the communications beam direction or the sensing beam direction, and the field is set to requested measurement duration, where the measurement duration is measured in 1 μs (TU/1024). A field value 4 indicates to measure ANIPIs of channels in both the communications beam direction and the sensing beam direction, and the field is set to the measurement duration, where the measurement duration is measured in one TU. A field value 5 indicates to measure RSNIs of channels in both the communications beam direction and the sensing beam direction, and the field is set to the measurement duration, where the measurement duration is measured in one TU. A field value 6 indicates to measure ANIPIs of channels in both the communications beam direction and the sensing beam direction, and the field is set to requested measurement duration, where the measurement duration is measured in 1 μs (TU/1024). A field value 7 indicates to measure RSNIs of channels in both the communications beam direction and the sensing beam direction, and the field is set to requested measurement duration, where the measurement duration is measured in 1 μs (TU/1024).

TABLE 1

| Field value | Description (description) |
|---|---|
| 0 | ANIPI |
| 1 | RSNI |
| 2 | Measure an ANIPI based on the requested measurement duration (ANIPI measured for requested measurement duration) |
| 3 | Measure an RSNI based on the requested measurement duration (RSNI measured for requested measurement duration) |
| 4 | Measure ANIPIs of the communications beam and the WLAN sensing beam (ANIPI measurement for communication & WLAN sensing) |
| 5 | Measure RSNIs of the communications beam and the WLAN sensing beam (RSNI measurement for communication & WLAN sensing) |
| 6 | Measure ANIPIs of the communications beam and the WLAN sensing beam based on the requested measurement duration (ANIPI measurement for |
| Field value | Description (description) |
| | communication & WLAN sensing for requested measurement duration) |
| 7 | Measure RSNIs of the communications beam and the WLAN sensing beam based on the requested measurement duration (RSNI measurement for communication & WLAN sensing for requested measurement duration) |
| Another value | Reserved (reserved) bit or reserved bit |

In this embodiment of this application, an existing directional channel quality request frame may be used as the first request message. In an existing protocol, a value of a measurement method field in the directional channel quality request frame is only from 0 to 3, and another value is a reserved value. In this embodiment of this application, four reserved values (from 4 to 7) are selected to indicate a station receiving the first request message to measure the channel quality in both the sensing beam direction and the communications beam direction.

Different meanings corresponding to different values of the first field shown in Table 1 are merely possible implementations, and shall not constitute any limitation on the protection scope of this application. In another possible implementation, the values 4 to 7 of the first field may be replaced with other reserved values, for example, (from 5 to 8), (9, 11, 14, 15), or the like, and these values may have other correspondences with the foregoing description. For example, the field value 7 indicates to measure the ANIPIs of the channels in both the communications beam direction and the sensing beam direction, and the field is set to the measurement duration, where the measurement duration is measured in one TU. A field value 9 indicates to measure the RSNIs of the channels in both the communications beam direction and the sensing beam direction, and the field is set to the measurement duration, where the measurement duration is measured in one TU. This is not limited in this embodiment of this application.

In addition, the first request message may be of another frame structure, and another existing field in the first request message may be reused as the first field, or the first field may be a newly added field in the first request message. This is not limited in this embodiment of this application either.

In this embodiment of this application, a directional channel quality request frame in a conventional spatial multiplexing mechanism is reused. This implements a function of measuring the channel quality in both the sensing beam direction and the communications beam direction, and helps simplify a frame structure, reduce signaling overheads, and improve system transmission performance.

In an optional embodiment, the first request message includes at least one of a second field and a third field, the second field indicates to measure channel quality in all sensing beam directions or measure channel quality in a specified sensing beam direction, and the third field indicates to feed back all values, an average value, a maximum value, or a minimum value of the measurement results of the sensing beams.

It should be understood that "the first station feeds back all values, an average value, a maximum value, or a minimum value of the measurement results of the sensing beams" indicated by the third field is specific to a sensing beam indicated by the second field. In other words, if the second field indicates the first station to measure the channel quality in all the sensing beam directions, "sensing beams" in the third field are all the sensing beams. If the second field indicates the first station to measure the channel quality in the specified sensing beam direction, the specified sensing beam may be one or more sensing beams, and the "sensing beam" in the third field is the one or more sensing beams. It should be further understood that if the specified sensing beam is one sensing beam, the third field indicates the first station to feed back a measurement result of the sensing beam. In this case, there is no average value, maximum value, or minimum value of the measurement results of the sensing beam.

For example, a value 0 of the second field indicates the station receiving the first request message to perform measurement in all the sensing beam directions; a value 1 of the second field indicates the station receiving the first request message to perform measurement in the specified sensing beam direction; a value 2 of the second field indicates that the station receiving the first request message may select a sensing beam and perform measurement in a corresponding sensing beam direction; and a value 3 of the second field indicates the reserved value.

For example, a value 0 of the third field indicates the station receiving the first request message to feed back measurement results of the one or more sensing beams (for example, all the sensing beams); a value 1 of the third field indicates the station receiving the first request message to feed back an average value of measurement results of all the sensing beams; a value 2 of the third field indicates the station receiving the first request message to feed back a maximum value of the measurement results of all the sensing beams; and a value 3 of the third field indicates the station receiving the first request message to feed back a minimum value of the measurement results of all the sensing beams.

With reference to the foregoing example, in a possible implementation, the first request message is used to request to measure the ANIPI. In this case, a value of the third field may be 2, to indicate to the station receiving the first request message to feed back the maximum value of the measurement results of all the sensing beams. SP spatial multiplexing cannot be performed provided that a measurement result of an ANIPI of one sensing beam is greater than a first threshold, and the SP spatial multiplexing can be performed only when measurement results of ANIPIs of all the sensing beams are less than the first threshold.

With reference to the foregoing example, in another possible implementation, the first request message is used to request to measure the RSNI. In this case, a value of the third field may be 3, to indicate to the station receiving the first request message to feed back the minimum value of the measurement results of all the sensing beams. SP spatial multiplexing cannot be performed provided that a measurement result of an RSNI of one sensing beam is less than a second threshold, and the SP spatial multiplexing can be performed only when measurement results of RSNIs of all the sensing beams are greater than the second threshold.

It should be understood that values of the second field and the third field are merely possible implementations, and shall not constitute any limitation on the protection scope of this application. In another possible implementation, the values of the second field and the third field may be replaced with other values. This is not limited in this embodiment of this application. For example, the value 1 of the second field indicates the station receiving the first request message to perform measurement in all the sensing beam directions. The value 2 of the third field indicates the station receiving the first request message to feed back the average value of the measurement results of all the sensing beams. Examples are not listed one by one herein.

In an optional embodiment, the second field indicates to measure the channel quality in the specified sensing beam direction, the first request message further includes a fourth field, and the fourth field indicates the specified sensing beam.

Optionally, the first request message may be the directional channel quality request frame shown in FIG. 6. A reserved value may be selected from the optional subelements field to indicate a newly added subelement. The newly added subelement indicates a specific parameter, for example, a sensing beam direction, feedback content, and the like, used for the WLAN sensing.

For example, as shown in Table 2, the reserved value is 4, and the newly added subelement may be referred to as an extended sensing measurement configuration subelement.

TABLE 2

| Subelement ID | Name | Extensible or not |
|---|---|---|
| 0 | Reserved (reserved) bit or reserved bit | |
| 1 | Directional channel quality report (directional channel quality reporting) | Yes |
| 2 | Measurement configuration (measurement configuration) | Yes |
| 3 | Extended measurement configuration (extended measurement configuration) | Yes |
| 4 | Extended sensing measurement configuration (extended sensing measurement configuration) | Yes |
| 5 to 220 | Reserved (reserved) bit or reserved bit | |
| 221 | Vendor specific (vendor specific) | Vendor defined (vendor defined) |
| 222 to 255 | Reserved (reserved) bit or reserved bit | |

Figure 7:
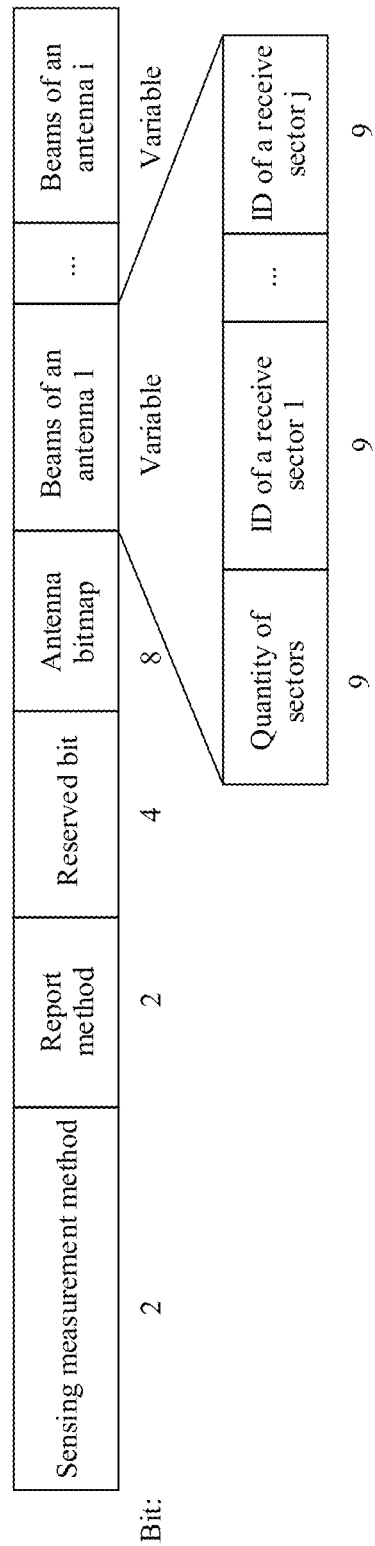
FIG. 7 is a schematic diagram of frame structures of a second field, a third field, and a fourth field in a first request message according to an embodiment of this application.

At least one of the second field and the third field may be included in the extended sensing measurement configuration subelement. Further, the extended sensing measurement configuration subelement may further include the fourth field. FIG. 7 is a schematic diagram of a frame structure of an extended sensing measurement configuration subelement. As shown in FIG. 7, the subelement may include the following fields:

(1) A sensing measurement method field is the foregoing second field.
(2) A report method field is the foregoing third field.
(3) Reserved bit or reserved bit.
(4) An antenna bitmap and beams of antennas 1 to i (beams of antenna 1 to beams of antenna i) are the foregoing fourth field.

A beam field of each antenna may further include a quantity (number) of sectors or an ID of each of receive sectors 1 to j (RX sector ID 1 to RX sector ID j). K specified sensing beams may be indicated by using the antennas and the sectors, where K=a quantity of antennas i×a quantity of sectors j, and both i and j are positive integers.

In an optional embodiment, the first measurement result fed back by the first station and the second station includes a fifth field, and the fifth field indicates a measurement result in each of the one or more sensing beam directions, or an average value, a maximum value, or a minimum value of the measurement results in the one or more sensing beam directions.

It should be understood that specific content of the fifth field depends on the value of the third field. If the value of the third field indicates to feed back the measurement results of the one or more sensing beams (for example, all the sensing beams), the fifth field feeds back the measurement results of the one or more sensing beams. If the value of the third field indicates to feed back the average value, the maximum value, or the minimum value of the measurement results of all the sensing beams, the fifth field feeds back the average value, the maximum value, or the minimum value of the measurement results of all the sensing beams.

In a possible implementation, the first measurement result may be a directional channel quality report frame. A frame structure of the directional channel quality report frame is shown in FIG. 8, and may include the following fields:

(1) An operating class indicates a channel set used in the directional channel quality report, and specifies, together with a channel number, a channel frequency and an interval used in the directional channel quality report.

(2) A channel number indicates a channel number used in the directional channel quality report.
(3) An association identifier (AID) is an AID allocated to a target station.
(4) Reserved bit or reserved bit.
(5) A measurement method indicates a method used by a requested station to perform current measurement, and a format in a measurement time block.
(6) Measurement start time.
(7) Measurement duration.
(8) A quantity (number) of time blocks indicates a quantity of time blocks in the foregoing "measurement duration". A ratio of the measurement duration to the quantity of time blocks is duration of a single measurement unit.
(9) Measurement time blocks 1 to N (measurement for a time block 1 to measurement for a time block N) indicate measurement results of corresponding time blocks.
(10) Optional subelements may not include a subelement, or may include one or more subelements.

Optionally, a reserved value may be selected from the optional subelements field to indicate a newly added subelement. The newly added subelement is the fifth field, and indicates a WLAN sensing measurement result, for example, a single-beam sensing measurement result or a multi-beam sensing measurement result.

For example, as shown in Table 3, the reserved value is 3, and the newly added subelement may be referred to as an extended sensing measurement report (extended sensing measurement report) subelement.

TABLE 3

| Subelement ID | Name | Extensible or not |
| --- | --- | --- |
| 0 | Measurement configuration (measurement configuration) | Yes |
| 1 | Extended measurement configuration (extended measurement configuration) | Yes |
| 2 | Extended measurement report (extended measurement report) | Yes |
| 3 | Extended sensing measurement report (extended sensing measurement report) | Yes |
| 4 to 220 | Reserved (reserved) bit or reserved bit | |
| 221 | Vendor specific (vendor specific) | Defined (vendor defined) |
| 222 to 255 | Reserved (reserved) bit or reserved bit | |

Figure 9:
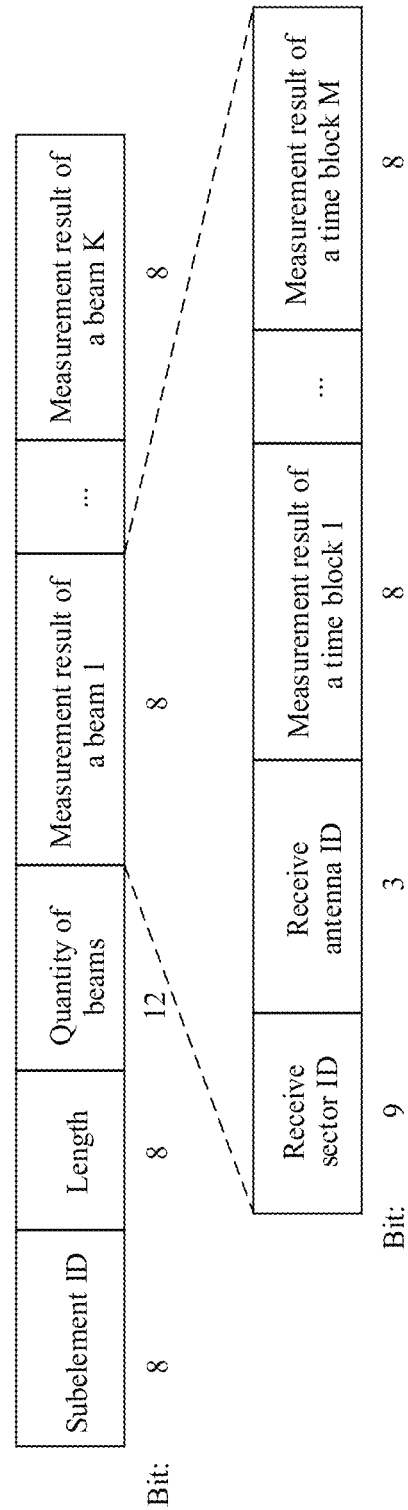
FIG. 9 is a schematic diagram of a frame structure of a fifth field in a first measurement result according to an embodiment of this application.

In a possible implementation, the extended sensing measurement report subelement is shown in FIG. 9, and indicates a measurement result of each sensing beam. In this case, a station may use the subelement to indicate an ID of each sensing beam and a corresponding measurement result. Specifically, the subelement shown in FIG. 9 may include the following fields:
(1) Subelement ID.
(2) Length.
(3) Quantity (number) of beams.
(4) Measurement results of beams 1 to K (measurement for beam 1 to measurement for beam N).

A measurement result field of each beam may further include a receive sector ID (RX sector ID), a receive antenna ID (RX antenna ID), and measurement results of time blocks 1 to M (measurement for a time block 1 to measurement for a time block M).

Figure 10:
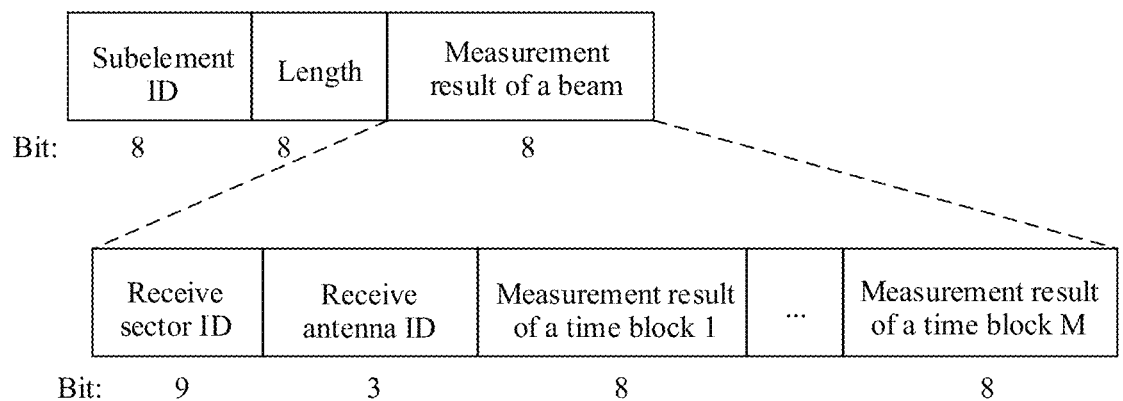
FIG. 10 is a schematic diagram of another frame structure of a fifth field in a first measurement result according to an embodiment of this application.

In another possible implementation, the extended sensing measurement report subelement is shown in FIG. 10, and indicates the maximum value or the minimum value of the measurement results of all the sensing beams. In this case, the station may use the subelement to indicate an ID of a sensing beam corresponding to the maximum value or the minimum value. Specifically, the subelement shown in FIG. 10 may include the following fields:
(1) Subelement ID.
(2) Length.
(3) Measurement result of a beam.

The measurement result of a beam field may further include a receive sector ID (RX sector ID), a receive antenna ID (RX antenna ID), and measurement results of time blocks 1 to M (measurement for a time block 1 to measurement for a time block N).

Figure 11:
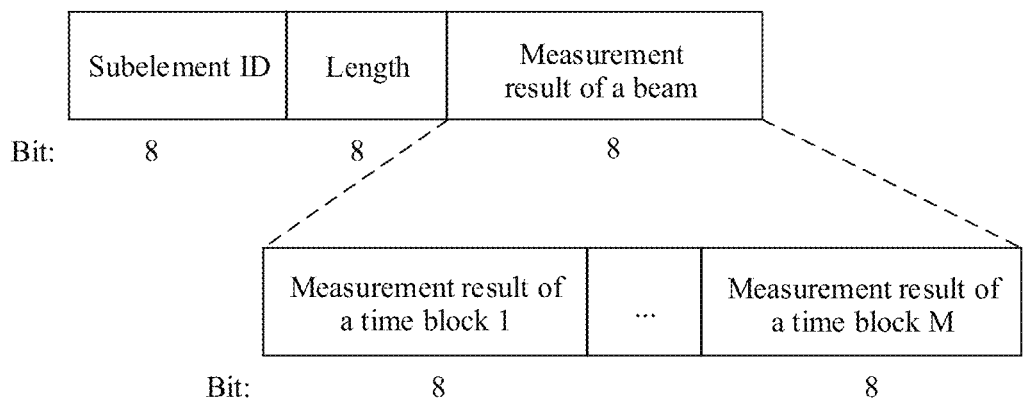
FIG. 11 is a schematic diagram of still another frame structure of a fifth field in a first measurement result according to an embodiment of this application.

In still another possible implementation, the extended sensing measurement report subelement is shown in FIG. 11, and indicates the average value of the measurement results of all the sensing beams. In this case, the station may use the subelement to indicate the average value, and does not need to indicate the ID of the sensing beam. Specifically, the subelement shown in FIG. 11 may include the following fields:
(1) Subelement ID.
(2) Length.
(3) Measurement result of a beam.

The measurement result of a beam field may further include measurement results of time blocks 1 to M (measurement for a time block 1 to measurement for a time block M).

That the reserved value 3 shown in Table 3 is used as an ID of the extended sensing measurement report subelement is merely a possible implementation, and shall not constitute any limitation on the protection scope of this application. In another possible implementation, the reserved value 3 may be replaced with another reserved value, for example, any value in 4 to 220 and 222 to 255. This is not limited in this embodiment of this application.

In addition, the first measurement result may be of another frame structure, and another existing field in the first measurement result may be reused as the fifth field, or the fifth field may be a newly added field in the first measurement result. This is not limited in this embodiment of this application either.

In this embodiment of this application, a directional channel quality report frame in the conventional spatial multiplexing mechanism is reused. This implements the function of measuring the channel quality in both the sensing beam direction and the communications beam direction, and helps simplify the frame structure, reduce the signaling overheads, and improve the system transmission performance.

It is considered that the measurement method field in the first request message may indicate to the station receiving the first request message to measure the sensing beam or measure both the sensing beam and the communications beam. Therefore, specific content of the first measurement result in this embodiment of this application may include the following two cases.

Case 1: Feed Back Only the Measurement Result of the Sensing Beam.

In a possible implementation, the station may set the measurement results of the time blocks 1 to N (measurement for a time block 1 to measurement for a time block N) in the field (9) in FIG. 8 to be null, that is, may not feed back a measurement result of any communications beam, and feed back the measurement results of the one or more sensing beams by using one frame structure in FIG. 9 to FIG. 11.

In another possible implementation, when the measurement results of the K sensing beams are fed back, the station may place a measurement result of one of the K sensing beams (for example, a beam 1) in the measurement results of the time blocks 1 to N (measurement for a time block 1 to measurement for a time block N) in the field (9) in FIG. 8, and then feed back a measurement result of another sensing beam by using the frame structure shown in FIG. 9. In this case, the measurement result field of the sensing beam in FIG. 9 may include only the receive sector ID field and the receive antenna ID field, and a measurement result field of another sensing beam still includes the receive sector ID field, the receive antenna ID field, and the measurement results of the time blocks 1 to M.

In another possible implementation, when the maximum value or the minimum value of the measurement results of the K sensing beams is fed back, the station may place a measurement result corresponding to the maximum value or the minimum value in the measurement results of the time blocks 1 to N (measurement for a time block 1 to measurement for a time block N) in the field (9) in FIG. 8, and then feed back the receive sector ID field and the receive antenna ID field by using the frame structure shown in FIG. 10. In this case, the measurement result of a beam field in FIG. 10 may include only the receive sector ID field and the receive antenna ID field.

In another possible implementation, when the average value of the measurement results of the K sensing beams is fed back, the station may place a measurement result corresponding to the average value in the measurement results of the time blocks 1 to N (measurement for a time block 1 to measurement for a time block N) in the field (9) in FIG. 8. In other words, the measurement result in FIG. 11 is placed in FIG. 8, and feedback does not need to be performed with reference to FIG. 11.

In a feedback manner in this embodiment of this application, an existing field is used to feed back the measurement result of the sensing beam to a maximum extent, so that the frame structure can be simplified, the signaling overheads can be reduced, and the system transmission performance can be improved.

Case 2: Feed Back the Measurement Result of the Sensing Beam and the Measurement Result of the Communications Beam.

The station may feed back the measurement result of the communications beam by using the measurement results of the time blocks 1 to N (measurement for a time block 1 to measurement for a time block N) in the field (9) in FIG. 8, and feed back the measurement results of the one or more sensing beams by using one frame structure in FIG. 9 to FIG. 11.

In an optional embodiment, the method further includes: The access point sends a first message, where the first message indicates to perform spatial multiplexing on the first SP and the second SP; and correspondingly, all of the first station, the second station, the third station, and the fourth station receive the first message.

It should be understood that, when determining, based on first measurement results of the four stations, to perform spatial multiplexing on the first SP and the second SP, the access point may determine whether at least one of the first SP and the second SP is used for WLAN sensing between stations. In other words, for example, the first station and the second station measure both the channel quality of the one or more sensing beams and the channel quality of the communications beam in the first SP. If the channel quality of the sensing beam does not meet a multiplexing condition, but the channel quality of the communications beam meets the multiplexing condition, and channel quality of communications beams of the third station and the fourth station also meets the multiplexing condition, the access point may perform spatial multiplexing on the first SP and the second SP. However, the first station and the second station are allowed to only perform communication in the spatial multiplexing process, and the first station and the second station are not allowed to perform WLAN sensing in the spatial multiplexing process. If both the channel quality of the sensing beam and the channel quality of the communications beam that are of the first station and the second station meet the multiplexing condition, and the channel quality of the communications beams of the third station and the fourth station also meets the multiplexing condition, the access point may allow the first station and the second station to perform communication and WLAN sensing in the spatial multiplexing phase while performing spatial multiplexing on the first SP and the second SP.

Therefore, optionally, the first message sent by the access point to the first station and the second station further indicates that the second SP is used by the first station to perform WLAN sensing with the second station. Similar to the first measurement request and the first measurement result, different stations may receive different first messages. The access point may indicate, in a plurality of manners, that the second SP is used to perform WLAN sensing between stations. This is not limited in this embodiment of this application.

Figure 12:
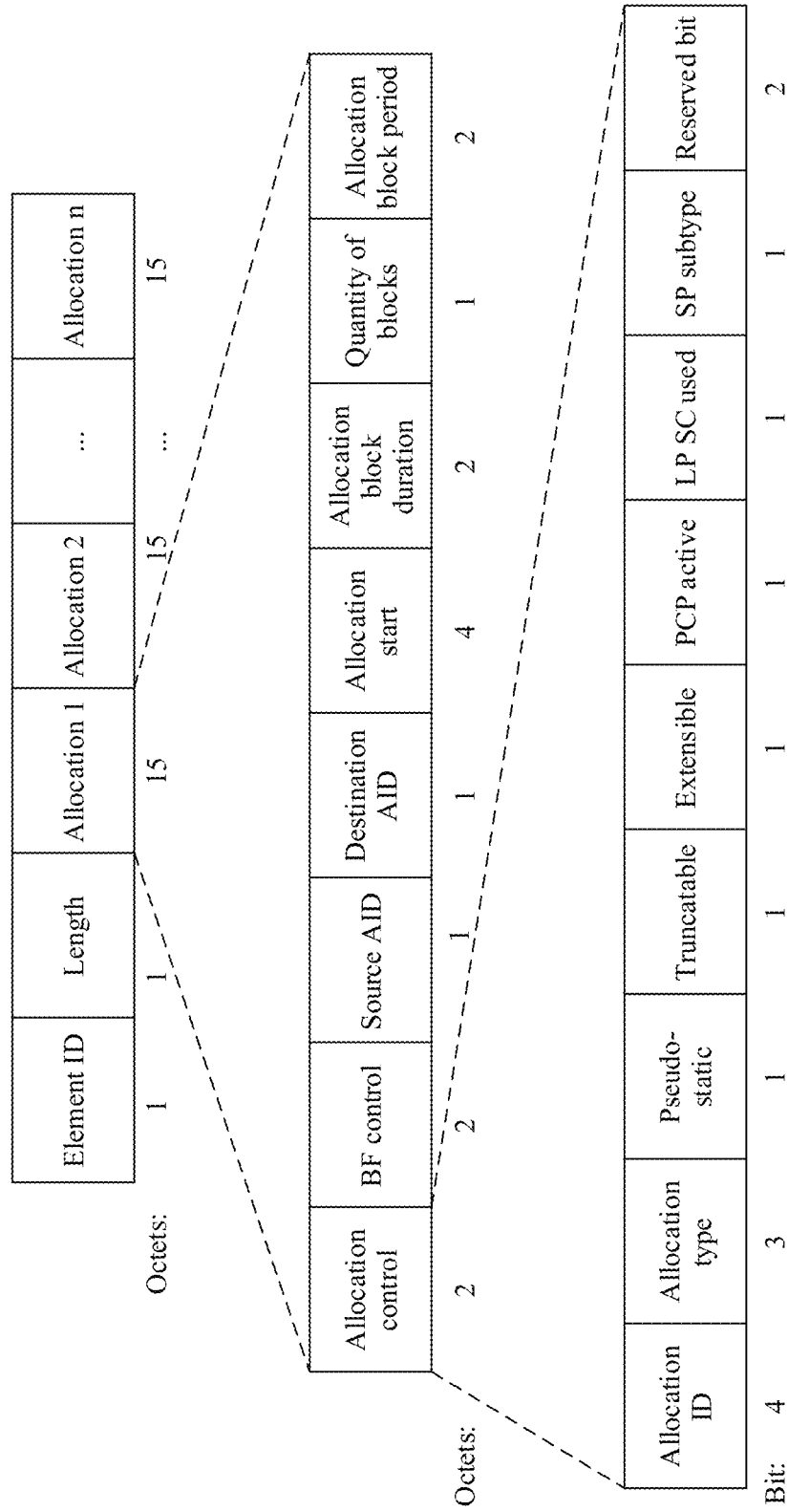
FIG. 12 is a schematic diagram of a frame structure of a first message according to an embodiment of this application.

For example, the first message may be an extended schedule element frame, and a specific frame structure may be shown in FIG. 12. The frame structure may include the following fields:
(1) Element ID.
(2) A length indicates a quantity of octets in an element other than the "element ID" and "length" fields.
(3) An allocation 1 to an allocation n are used to sort allocation fields by allocating start time.

For each allocation, the allocation 1 is used as an example, the following fields may be included:
(1) Allocation control.
(2) Beamforming control.
(3) A source AID indicates an AID of a STA that starts channel access during an SP or CBAP allocation, or in a case of the CBAP allocation, if the AP allows all STAs to perform transmission in a CBAP, the source AID may alternatively be set to a broadcast AID for allocation.
(4) A destination AID indicates an AID of a STA targeted by a source STA during an SP or CBAP allocation, or the destination AID is set to a broadcast AID (if the source STA targets more than one STA during the allocation).

(5) Allocation start.
(6) Allocation block duration.
(7) Quantity of blocks.
(8) An allocation block period includes time (in microseconds) between starts of two consecutive time blocks belonging to a same allocation. When the foregoing "quantity of blocks" field is set to 1, the field is a reserved bit or a reserved bit.

The allocation control field may further include the following fields:
(1) An allocation ID indicates an allocation of call duration from the source AID to the destination AID when the allocation ID is set to a non-zero value. In addition to a CBAP allocation with a broadcast source AID and a broadcast target AID, a tuple (a source AID, a target AID, an allocation ID) uniquely identifies an allocation.
(2) An allocation type defines a channel access mechanism during an allocation.
(3) Pseudo-static.
(4) A truncatable field indicates that when the field is set to 1, the source STA and a destination STA may require an SP to be truncated.
(5) An extendable field indicates that when the field is set to 1, the source STA and the destination STA may require SP to be extended.
(6) A PCP active field indicates whether a personal basic service set control point is in an active state.
(7) A low power single carrier used (LP SC used) field indicates whether to use a low power consumption single-carrier mode.
(8) Reserved bit or reserved bit.

In a possible implementation, the allocation type field in the allocation control field may indicate that an SP scheduled by a current extended schedule element frame is used for the WLAN sensing. For example, a reserved combination, for example, 001, may be selected in the allocation type field to indicate that the SP is used for the WLAN sensing. As shown in Table 4, 000 indicates to allocate the SP, 100 indicates to allocate a CBAP, 010 indicates to allocate the SP on a 1.08 GHz channel, 110 indicates to allocate the CBAP on the 1.08 GHz channel, 001 indicates that the allocated SP is used for the sensing, and another combination is a reserved value. For example, the allocation ID field occupies four bits (a bit 0 to a bit 3), and the allocation type field occupies three bits (a bit 4 to a bit 6).

TABLE 4

| Bit 4 | Bit 5 | Bit 6 | Meaning |
|---|---|---|---|
| 0 | 0 | 0 | Allocate the SP |
| 1 | 0 | 0 | Allocate the CBAP |
| 0 | 1 | 0 | Allocate the SP on the 1.08 GHz channel |
| 1 | 1 | 0 | Allocate the CBAP on the 1.08 GHz channel |
| 0 | 0 | 1 | Allocated SP is used for the sensing |
| Another combination | | | Reserved value |

It should be understood that using the reserved value 001 shown in Table 4 to indicate that the currently scheduled SP is used for the WLAN sensing is merely a possible implementation, and shall not constitute any limitation on the protection scope of this application. In another possible implementation, the reserved value 001 may be replaced with another reserved value, for example, any combination other than 000, 100, 010, and 110. This is not limited in this embodiment of this application.

In addition, the first message may be of another frame structure, and another existing field in the first message may be reused as a field indicating that the currently scheduled SP is used for the WLAN sensing, or the field may be a newly added field in the first message. This is not limited in this embodiment of this application either.

In another possible implementation, an indication field, for example, an SP subtype field shown in FIG. 12, indicating whether the allocated SP is used for the communication or sensing may be added to the allocation control field. As shown in Table 5, a length of the SP subtype field is 1 bit, a value 0 of the SP subtype field indicates that an SP scheduled by a current extended schedule element frame is used for the communication, and a value 1 of the SP subtype field indicates that the SP scheduled by the current extended schedule element frame is used for the WLAN sensing.

TABLE 5

| Bit 13 | Meaning |
|---|---|
| 0 | Used for the communication |
| 1 | Used for the sensing |
| Another combination | Reserved value |

The SP subtype field may alternatively be of another length, for example, two bits. This is not limited in this embodiment of this application. In addition, different values and different meanings of the SP subtype field may also be another correspondence. For example, the value 1 of the SP subtype field indicates that the SP scheduled by the current extended schedule element frame is used for the communication, and the value 0 of the SP subtype field indicates that the SP scheduled by the current extended schedule element frame is used for the WLAN sensing. This is not limited in this embodiment of this application.

In an optional embodiment, the first message sent to the first station and the second station further indicates at least one of the first station and the second station to perform WLAN sensing in all the sensing beam directions in the second SP, or at least one of the first station and the second station to perform WLAN sensing in the specified sensing beam direction in the second SP.

Figure 13:
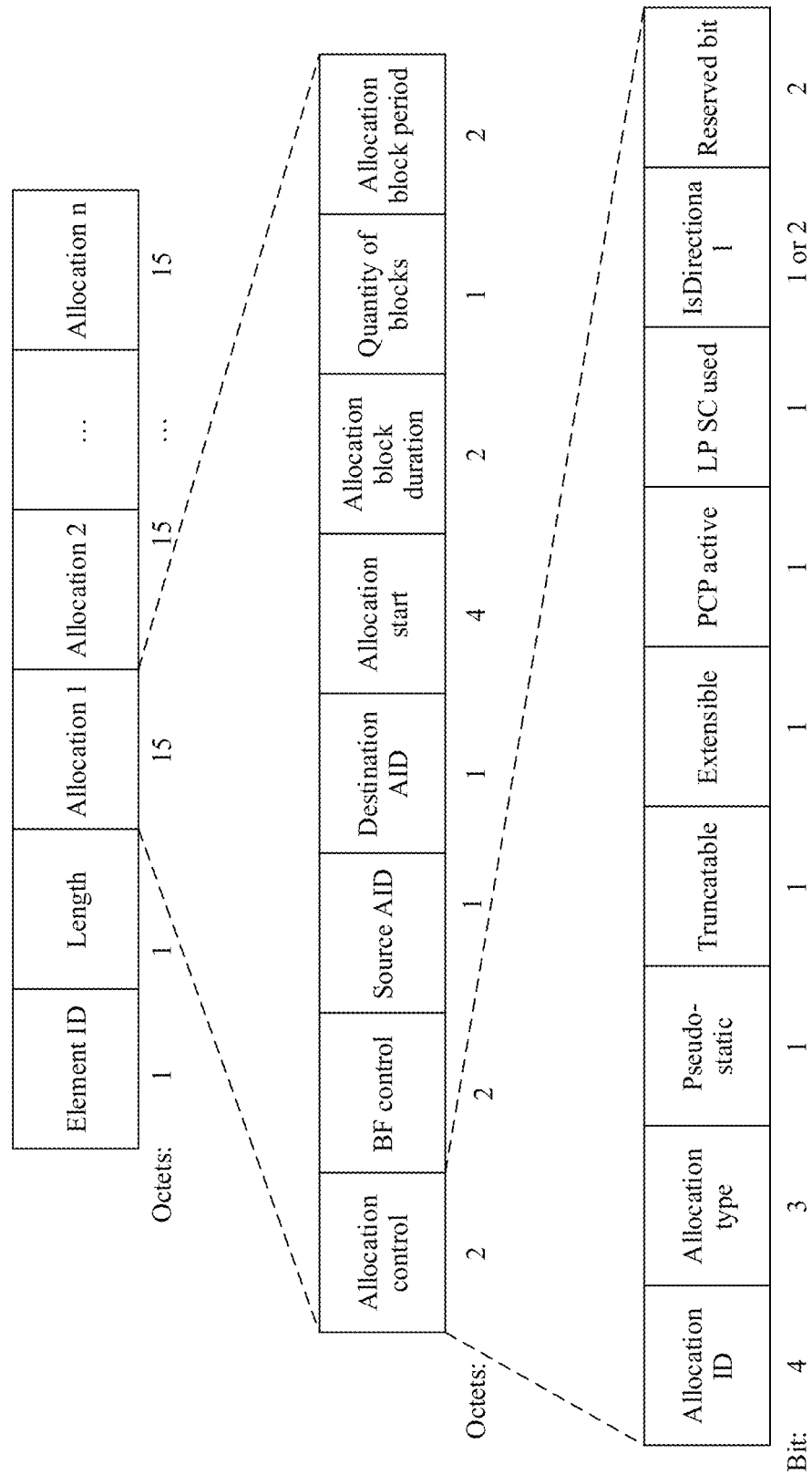
FIG. 13 is a schematic diagram of another frame structure of a first message according to an embodiment of this application.

Optionally, the first message may be an extended schedule element frame. A field may be added to the extended schedule element frame to indicate whether a sensing beam direction of a station during the WLAN sensing is directional or omnidirectional. As shown in FIG. 13, the foregoing newly added field may be an IsDirectional field in an allocation control field.

In a possible design, a length of the IsDirectional field may be 1 bit, indicating that WLAN sensing manners of the source station and the destination station are the same (that is, both the source station and the destination station perform sensing in an omnidirectional manner, or both the source station and the destination station perform sensing by using a specified sensing beam. The source station may also be referred to as a transmit station, and the destination station may also be referred to as a receive station). In this case, for example, a value 0 of the IsDirectional field indicates that the source station and the destination station perform WLAN sensing in the omnidirectional manner (that is, perform WLAN sensing in all the sensing beam directions), and a value 1 of the IsDirectional field indicates that the source station and the destination station perform WLAN sensing by using the specified sensing beam (that is, perform WLAN sensing in the specified sensing beam direction).

In another possible design, a length of the IsDirectional field may be 2 bits, indicating that WLAN sensing manners of the source station and the destination station may be configured independently of each other. For example, if a value 00 of the IsDirectional field indicates that the source station and the destination station perform WLAN sensing in an omnidirectional manner; a value 11 of the IsDirectional field indicates that the source station and the destination station perform WLAN sensing by using a specified sensing beam; a value 10 of the IsDirectional field indicates that the source station performs WLAN sensing by using the specified sensing beam, and that the destination station performs WLAN sensing in the omnidirectional manner; and a value 01 of the IsDirectional field indicates that the source station performs WLAN sensing in the omnidirectional manner, and that the destination station performs WLAN sensing by using the specified sensing beam.

It should be understood that there may be another correspondence between different values and different meanings of the IsDirectional field, and the field may alternatively be of another length. This is not limited in this embodiment of this application. In addition, if the SP configured in the first message cannot be used for the WLAN sensing, the IsDirectional field may be a reserved bit.

In an optional embodiment, the first message indicates at least one of the following: The first station performs WLAN sensing in the specified sensing beam direction in the second SP, where the first message further indicates a specified sensing beam corresponding to the first station; and the second station performs WLAN sensing in the specified sensing beam direction in the second SP, where the first message further indicates a specified sensing beam corresponding to the second station.

Figure 14:
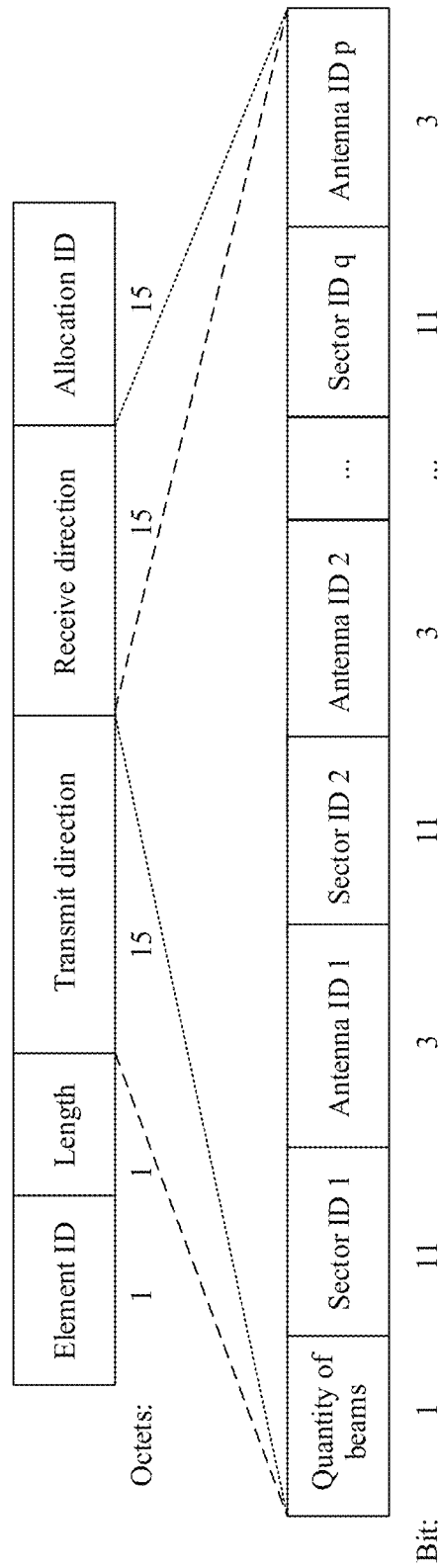
FIG. 14 is a schematic diagram of a frame structure of a second message according to an embodiment of this application.

In this embodiment of this application, the first station and the second station perform WLAN sensing in the second SP, where one station is the source station, and the other station is the destination station. For example, information about the specified beam may be included in a newly defined extended sensing schedule element. A specific frame structure is shown in FIG. 14, and includes the following fields:
(1) Element ID.
(2) Length.
(3) Transmit direction.
(4) Receive direction.
(5) Allocation ID, where
    a field corresponding to at least one direction of the transmit direction or the receive direction may further include the following fields:
(1) Quantity (number) of directions.
(2) A Sector ID 1 to a sector ID q, where q is a positive integer.
(3) An antenna ID 1 to an antenna ID p, where p is a positive integer.

It should be understood that, in the foregoing example, if the IsDirectional field indicates that the sensing beam direction in which the source station performs WLAN sensing is directional, the transmit direction includes the foregoing field; if the IsDirectional field indicates that the sensing beam direction in which the destination station performs WLAN sensing is directional, the receive direction includes the foregoing field; or if the IsDirectional field indicates that sensing beam directions in which the source station and the destination station perform WLAN sensing are directional, both the transmit direction and the receive direction include the foregoing field. The frame structure designed in this embodiment of this application has good compatibility.

In an optional embodiment, the first station is a receiver of the WLAN sensing, and during the spatial multiplexing performed on the first SP and the second SP, the method further includes:

The access point sends a third request message to the first station, where the third request message is used to request to measure channel quality in the one or more sensing beam directions in the second SP; and correspondingly, the first station receives the third request message.

The access point sends a fourth request message to the third station and the fourth station, where the fourth request message is used to request to measure channel quality in a communications beam direction in the first SP; and correspondingly, the third station and the fourth station separately receive the fourth request message.

The first station performs a measurement in the one or more sensing beam directions in the second SP based on the third request message, to obtain a second measurement result; and the second station does not need to perform a measurement for being a transmitter of the WLAN sensing.

The third station performs a measurement in the communications beam direction in the first SP based on the fourth request message, to obtain a second measurement result.

The fourth station performs a measurement in the communications beam direction in the first SP based on the fourth request message, to obtain a second measurement result.

The access point separately receives the second measurement result from the first station, the third station, and the fourth station.

The access point determines, based on the second measurement result, whether to continue to perform spatial multiplexing on the first SP and the second SP.

The measurement process described above is measurement in the spatial multiplexing phase, and is similar to the previous measurement process described in S301 to S311. A difference lies in that in the early measurement phase, the first station and the second station do not perform WLAN sensing, but sense channel quality of a sensing beam only in a corresponding SP; and the third station and the fourth station do not perform communication, but sense channel quality of a communications beam only in a corresponding SP. However, in the spatial multiplexing phase, the first station and the second station perform WLAN sensing, and obtain the channel quality of the sensing beam at the same time; and the third station and the fourth station perform communication, and obtain the channel quality of the communications beam at the same time. Usually, the measurement result of the ANIPI is requested in the early measurement phase, and the measurement result of the RSNI is requested in the spatial multiplexing phase.

It should be understood that the fourth request message sent by the access point to the third station and the fourth request message sent by the access point to the fourth station are two independent messages, and specific content may be the same or may be different. In this embodiment of this application, the messages sent by the access point to the third station and the fourth station are named the same only because the messages sent by the access point to the third station and the fourth station have a same function and a same frame structure. However, content of the fourth request message received by the third station and content of the fourth request message received by the fourth station are not limited to be completely the same.

Similarly, in this embodiment of this application, the second measurement result of the first station, the second measurement result of the third station, and the second measurement result of the fourth station exist. It should be understood that the measurement results of the stations may be different. Similar to the fourth request message, in this embodiment of this application, the measurement results obtained by the stations are named the same only because the measurement results obtained by the stations have a same function and a same frame structure. However, content of the fourth measurement results of the stations is not limited to be completely the same.

A specific frame structure of the third request message may be similar to a specific frame structure of the first request message. For example, the directional channel quality request frame may be reused for the third request message and the fourth request message. Details are not described herein again.

A specific frame structure of the second measurement result may be similar to a specific frame structure of the first measurement result. For example, the directional channel quality report frame may be reused for the second measurement result. Details are not described herein again.

Optionally, in the spatial multiplexing phase, the access point may not indicate the one or more sensing beams by using the third request message, but the first station may perform measurement based on a sensing beam that is configured by using the first message and that is used for the WLAN sensing. In other words, a field that is in the third request message and that indicates the one or more sensing beams may be set to a reserved bit or a reserved bit.

The foregoing method 300 describes only a scenario in which the first SP is at least used by the third station to communicate with the fourth station, and the second SP is at least used by the first station and the second station to perform WLAN sensing. In another scenario of this application, the first SP is at least used by the third station and the fourth station to perform WLAN sensing, and the second SP is at least used by the first station and the second station to perform WLAN sensing. In this case, S302 may be replaced with: The access point sends a fifth request message to the third station and the fourth station, where the fifth request message is used to request to measure the channel quality in the one or more sensing beam directions in the second SP; and correspondingly, the third station and the fourth station may measure the sensing beam based on the fifth request message, to obtain a corresponding measurement result, and report the measurement result to the access point. Content of the fifth request message may be similar to content of the first request message. Details are not described herein again.

In actual application of this embodiment of this application, the sensing beam may be replaced with another type of beam based on different requirements, to adapt to another scenario. In addition, the SP used for the WLAN sensing may also be replaced with another type of SP. This is not limited in this application.

It should be understood that, sequence numbers of the foregoing processes do not mean execution sequences. The execution sequences of the processes should be determined based on functions and internal logic of the processes, and should not be construed as any limitation on the implementation processes of embodiments of this application.

The foregoing describes in detail the spatial multiplexing method according to embodiments of this application with reference to FIG. 1 to FIG. 14. The following describes in detail spatial multiplexing apparatuses according to embodiments of this application with reference to FIG. 15 to FIG. 16.

Figure 15:
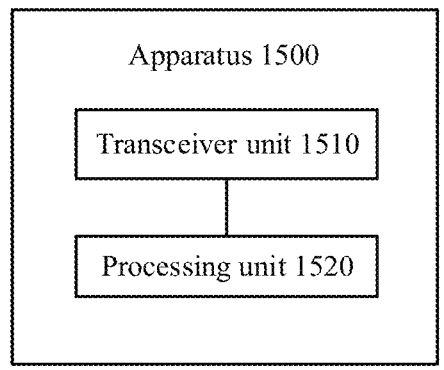
FIG. 15 is a schematic block diagram of a spatial multiplexing apparatus according to an embodiment of this application.

FIG. 15 shows a spatial multiplexing apparatus 1500 according to an embodiment of this application. In a design, the apparatus 1500 may be a station, or may be a chip in a station. In another design, the apparatus 1500 may be an access point, or may be a chip in an access point. The apparatus 1500 includes a transceiver unit 1510 and a processing unit 1520.

In a possible implementation, the apparatus 1500 is configured to perform procedures and steps corresponding to the first station in the method 300.

The transceiver unit 1510 is configured to receive a first request message from an access point, where the first request message is used to request to measure channel quality in one or more sensing beam directions in a first service period SP. The processing unit 1520 is configured to perform measurement in the one or more sensing beam directions in the first SP based on the first request message, to obtain a first measurement result, where the first SP is an SP of at least one operation of communication and wireless local area network WLAN sensing performed by a third station and a fourth station. The transceiver unit 1510 is further configured to send the first measurement result to the access point.

Optionally, the first request message is further used to request to measure channel quality in a communications beam direction in the first SP; and the processing unit 1520 is specifically configured to perform measurement in the one or more sensing beam directions and the communications beam direction in the first SP based on the first request message, to obtain the first measurement result.

Optionally, the first request message includes a first field, and a value of the first field is a reserved value indicating to measure the channel quality in both the sensing beam direction and the communications beam direction.

Optionally, the first request message includes at least one of a second field and a third field, the second field indicates to measure channel quality in all sensing beam directions or measure channel quality in a specified sensing beam direction, and the third field indicates to feed back all values, an average value, a maximum value, or a minimum value of the measurement results of the sensing beams.

Optionally, the second field indicates to measure the channel quality in the specified sensing beam direction, the first request message further includes a fourth field, and the fourth field indicates the specified sensing beam.

Optionally, the first measurement result includes a fifth field, and the fifth field indicates a measurement result in at least one of the one or more sensing beam directions, or an average value, a maximum value, or a minimum value of measurement results in the one or more sensing beam directions.

Optionally, the transceiver unit 1510 is further configured to: after sending the first measurement result to the access point, receive a first message from the access point, where the first message indicates to perform spatial multiplexing on the first SP and a second SP.

Optionally, the first message further indicates that the second SP is used by the apparatus to perform WLAN sensing with a second station.

Optionally, the first message further indicates at least one of the apparatus and the second station to perform WLAN sensing in all the sensing beam directions in the second SP, or the apparatus and at least one station of the second station to perform WLAN sensing in the specified sensing beam direction in the second SP.

Optionally, the first message indicates at least one of the following: The apparatus performs WLAN sensing in the specified sensing beam direction in the second SP, where the first message further indicates a specified sensing beam corresponding to the apparatus; and the second station performs WLAN sensing in the specified sensing beam direction in the second SP, where the first message further indicates a specified sensing beam corresponding to the second station.

Optionally, the apparatus is a receiver of the WLAN sensing, and the transceiver unit 1510 is further configured to: during the spatial multiplexing performed on the first SP and the second SP, receive a third request message from the access point, where the third request message is used to request to measure channel quality in the one or more sensing beam directions in the second SP. The processing unit 1520 is further configured to perform signal measurement in the one or more sensing beam directions in the second SP based on the third request message, to obtain a second measurement result. The transceiver unit 1510 is further configured to send the second measurement result to the access point.

In another possible implementation, the apparatus 1500 is configured to perform procedures and steps corresponding to the access point in the method 300.

The transceiver unit 1510 is configured to: send a first request message to a first station and a second station, where the first request message is used to request to measure channel quality in one or more sensing beam directions in a first service period SP; send a second request message to a third station and a fourth station, where the second request message is used to request to measure channel quality in a communications beam direction in a second SP, the first SP is at least used by the third station to communicate with the fourth station, and the second SP is at least used by the first station and the second station to perform wireless local area network WLAN sensing; and separately receive a first measurement result from the first station, the second station, the third station, and the fourth station. The processing unit 1520 is configured to determine, based on the first measurement result, whether to perform spatial multiplexing on the first SP and the second SP.

Optionally, the first SP is further used by the third station to communicate with the fourth station, and the first request message is further used to request to measure channel quality in a communications beam direction in the first SP.

Optionally, the first request message includes a first field, and a value of the first field is a reserved value indicating to measure the channel quality in both the sensing beam direction and the communications beam direction.

Optionally, the first request message includes at least one of a second field and a third field, the second field indicates to measure channel quality in all sensing beam directions or measure channel quality in a specified sensing beam direction, and the third field indicates to feed back all values, an average value, a maximum value, or a minimum value of the measurement results of the sensing beams.

Optionally, the second field indicates to measure the channel quality in the specified sensing beam direction, the first request message further includes a fourth field, and the fourth field indicates the specified sensing beam.

Optionally, the first measurement result fed back by the first station and the second station includes a fifth field, and the fifth field indicates a measurement result in each of the one or more sensing beam directions, or an average value, a maximum value, or a minimum value of the measurement results in the one or more sensing beam directions.

Optionally, the transceiver unit 1510 is further configured to send a first message, where the first message indicates to perform spatial multiplexing on the first SP and the second SP.

Optionally, the first message further indicates that the second SP is used by the first station to perform WLAN sensing with the second station.

Optionally, the first message further indicates the first station and at least one station of the second station to perform WLAN sensing in all the sensing beam directions in the second SP, or the first station and at least one station of the second station to perform WLAN sensing in the specified sensing beam direction in the second SP.

Optionally, the first message indicates at least one of the following: The first station performs WLAN sensing in the specified sensing beam direction in the second SP, where the first message further indicates a specified sensing beam corresponding to the first station; and the second station performs WLAN sensing in the specified sensing beam direction in the second SP, where the first message further indicates a specified sensing beam corresponding to the second station.

Optionally, the first station is a receiver of the WLAN sensing, and the transceiver unit 1510 is further configured to: during the spatial multiplexing performed on the first SP and the second SP, send a third request message to the first station, where the third request message is used to request to measure channel quality in the one or more sensing beam directions in the second SP; send a fourth request message to the third station and the fourth station, where the fourth request message is used to request to measure the channel quality in the communications beam direction in the first SP; and separately receive a second measurement result from the first station, the third station, and the fourth station. The processing unit 1520 is further configured to determine, based on the second measurement result, whether to continue to perform spatial multiplexing on the first SP and the second SP.

It should be understood that the apparatus 1500 herein is embodied in a form of a functional unit. The term "unit" herein may be an application-specific integrated circuit (ASIC), an electronic circuit, a processor (for example, a shared processor, a dedicated processor, or a group processor) and a memory that are configured to execute one or more software or firmware programs, a combined logic circuit, and/or another appropriate component supporting the described function. In an optional example, a person skilled in the art may understand that the apparatus 1500 may be specifically the first station or the access point in the foregoing embodiments, and the apparatus 1500 may be configured to perform procedures and/or steps corresponding to the first station or the access point in the foregoing method embodiments. To avoid repetition, details are not described herein again.

The apparatus 1500 in the foregoing solutions has a function of implementing a corresponding step performed by the first station or the access point in the foregoing method. The function may be implemented by hardware, or may be implemented by hardware by executing corresponding software. The hardware or the software includes one or more modules corresponding to the foregoing function. For example, the transceiver unit 1510 may include a sending unit and a receiving unit. The sending unit may be configured to implement steps and/or procedures that correspond to the transceiver unit and that are for performing a sending action, and the receiving unit may be configured to implement steps and/or procedures that correspond to the transceiver unit and that are for performing a receiving action. The sending unit may be replaced with a transmitter, and the receiving unit may be replaced with a receiver, to separately perform receiving and sending operations and related processing operations in the method embodiments.

In this embodiment of this application, the apparatus 1500 in FIG. 15 may alternatively be a chip or a chip system, for example, a system on chip (SoC). Correspondingly, the transceiver unit 1510 may be a transceiver circuit of the chip. This is not limited herein.

Figure 16:
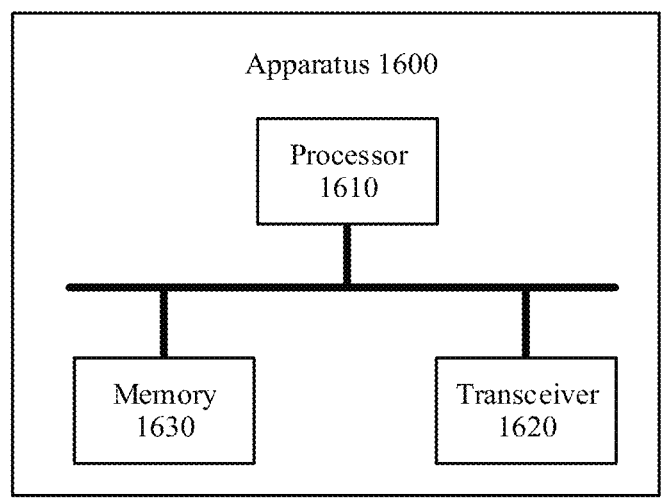
FIG. 16 is a schematic block diagram of another spatial multiplexing apparatus according to an embodiment of this application.

FIG. 16 shows another spatial multiplexing apparatus 1600 according to an embodiment of this application. The apparatus 1600 includes a processor 1610, a transceiver 1620, and a memory 1630. The processor 1610, the transceiver 1620, and the memory 1630 communicate with each other through an internal connection path. The memory 1630 is configured to store instructions. The processor 1610 is configured to execute the instructions stored in the memory 1630, to control the transceiver 1620 to send a signal and/or receive a signal.

In a possible implementation, the apparatus 1600 is configured to perform procedures and steps corresponding to the first station in the method 300.

The transceiver 1620 is configured to receive a first request message from an access point, where the first request message is used to request to measure channel quality in one or more sensing beam directions in a first service period SP. The processor 1610 is configured to perform measurement in the one or more sensing beam directions in the first SP based on the first request message, to obtain a first measurement result, where the first SP is an SP of at least one operation of communication and wireless local area network WLAN sensing performed by a third station and a fourth station. The transceiver 1620 is further configured to send the first measurement result to the access point.

In another possible implementation, the apparatus 1600 is configured to perform procedures and steps corresponding to the access point in the method 300.

The transceiver 1620 is configured to: send a first request message to a first station and a second station, where the first request message is used to request to measure channel quality in one or more sensing beam directions in a first service period SP; send a second request message to a third station and a fourth station, where the second request message is used to request to measure channel quality in a communications beam direction in a second SP, the first SP is at least used by the third station to communicate with the fourth station, and the second SP is at least used by the first station and the second station to perform wireless local area network WLAN sensing; and separately receive a first measurement result from the first station, the second station, the third station, and the fourth station. The processor 1610 is configured to determine, based on the first measurement result, whether to perform spatial multiplexing on the first SP and the second SP.

It should be understood that the apparatus 1600 may be specifically the first station or the access point in the foregoing embodiments, and the apparatus 1600 may be configured to perform steps and/or procedures corresponding to the first station or the access point in the foregoing method embodiments. Optionally, the memory 1630 may include a read-only memory and a random access memory, and provide instructions and data for the processor. A part of the memory may further include a non-volatile random access memory. For example, the memory may further store information of a device type. The processor 1610 may be configured to execute the instructions stored in the memory. When the processor 1610 executes the instructions stored in the memory, the processor 1610 is configured to perform the steps and/or procedures of the method embodiments corresponding to the first station or the access point. The transceiver 1620 may include a transmitter and a receiver. The transmitter may be configured to implement steps and/or procedures that correspond to the transceiver and that are for performing a sending action, and the receiver may be configured to implement steps and/or procedures that correspond to the transceiver and that are for performing a receiving action.

It should be understood that in embodiments of this application, the processor in the foregoing apparatus may be a central processing unit (CPU), or the processor may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

In an implementation process, the steps in the foregoing methods may be implemented by using a hardware integrated logic circuit in the processor, or by using instructions in a form of software. The steps of the method disclosed with reference to embodiments of this application may be directly performed by a hardware processor, or may be performed by using a combination of hardware and software units in the processor. A software unit may be located in a mature storage medium in the art, such as a random access memory, a flash memory, a read-only memory, a programmable read-only memory, an electrically erasable programmable memory, a register, or the like. The storage medium is located in the memory, and a processor executes instructions in the memory and completes the steps in the foregoing methods in combination with hardware of the processor. To avoid repetition, details are not described herein again.

A person of ordinary skill in the art may be aware that, in combination with the examples described in embodiments disclosed in this specification, method steps and units may be implemented by electronic hardware, computer software, or a combination thereof. To clearly describe the interchangeability between hardware and software, the foregoing description has generally described steps and compositions of each embodiment according to functions. Whether functions are performed by hardware or software depends on particular applications and design constraint conditions of the technical solutions. A person of ordinary skill in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed systems, apparatuses, and methods may be implemented in other manners. For example, the described apparatus embodiments are merely examples. For example, division into units is merely logical function division and may be other division in an actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of the software functional unit and is sold or used as an independent product, the integrated unit may be stored in a computer-readable storage medium. Based on such an understanding, the technical solutions of embodiments of this application essentially, or the part contributing to the conventional technology, all or some of the technical solutions may be implemented in a form of a software product. The computer software product is stored in a storage medium, and includes several instructions for instructing a computer device (which may be a personal computer, a server, or a network device) or a processor to perform all or some of the steps of the methods described in embodiments of this application. The foregoing storage medium includes: any medium that can store program code, such as a USB flash drive, a removable hard disk, a read-only memory (ROM), a random access memory (RAM), a magnetic disk, or an optical disc.

The foregoing description is merely a specific embodiment of this application, but is not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A spatial multiplexing apparatus, comprising:
   a transceiver configured to receive a first request message from an access point, wherein the first request message is used to request to measure a channel quality in one or more sensing beam directions in a first service period (SP); and
   a processor configured to perform measurement in the one or more sensing beam directions in the first SP based on the first request message, to obtain a first measurement result, wherein the first SP is an SP of at least one operation of communication and wireless local area network (WLAN) sensing performed by a third station and a fourth station, and
   the transceiver is further configured to:
   send the first measurement result to the access point.

2. The apparatus according to claim 1, wherein the first request message is further used to request to measure a channel quality in a communications beam direction in the first SP; and
   the processor is configured to:
   perform, based on the first request message, measurement in the one or more sensing beam directions and the communications beam direction in the first SP, to obtain the first measurement result.

3. The apparatus according to claim 2, wherein the first request message comprises a first field, and a value of the first field is a reserved value indicating to measure the channel qualities in both the sensing beam direction and the communications beam direction.

4. The apparatus according to claim 1, wherein the first request message comprises at least one of a second field and a third field, the second field indicates to measure a channel quality in all sensing beam directions to produce measurement results for all sensing beam directions or measure a channel quality in a specified sensing beam direction to produce the first measurement result, and the third field indicates to feed back all values, an average value, a maximum value, or a minimum value of the measurement results for all sensing beam directions or the specified sensing beam direction.

5. The apparatus according to claim 4, wherein the second field indicates to measure the channel quality in the specified sensing beam direction, the first request message further comprises a fourth field that indicates a specified sensing beam.

6. The apparatus according to claim 4, wherein the first measurement result comprises a fifth field that indicates a measurement result in at least one of the one or more sensing beam directions or the specified sensing beam direction, or an average value, a maximum value, or a minimum value of measurement results in the one or more sensing beam directions or the specified sensing beam direction.

7. The apparatus according to claim 1, wherein the transceiver is further configured to:
   receive a first message from the access point, wherein the first message indicates to perform spatial multiplexing on the first SP and a second SP.

8. The apparatus according to claim 7, wherein the first message further indicates that the second SP is used by the apparatus to perform WLAN sensing with a second station.

9. The apparatus according to claim 8, wherein the first message further indicates at least one of the apparatus and the second station to perform WLAN sensing in all the sensing beam directions in the second SP, or at least one of the apparatus and the second station to perform WLAN sensing in the specified sensing beam direction in the second SP.

10. The apparatus according to claim 9, wherein the first message indicates at least one of the following:
    the apparatus performs WLAN sensing in the specified sensing beam direction in the second SP, wherein the first message further indicates the specified sensing beam corresponding to the apparatus; and
    the second station performs WLAN sensing in the specified sensing beam direction in the second SP, wherein the first message further indicates the specified sensing beam corresponding to the second station.

11. The apparatus according to claim 7, wherein the apparatus is configured to receive the WLAN sensing, and the transceiver is further configured to:
    receive a third request message from the access point during the spatial multiplexing, wherein the third request message is used to request to measure a channel quality in the one or more sensing beam directions in the second SP;
    the processor is further configured to:
    perform, based on the third request message, a signal measurement in the one or more sensing beam directions in the second SP to obtain a second measurement result; and
    the transceiver is further configured to:
    send the second measurement result to the access point.

12. A spatial multiplexing apparatus, comprising:
a transceiver, configured to: send a first request message to a first station and a second station, wherein the first request message is used to request to measure a channel quality in one or more sensing beam directions in a first service period SP; send a second request message to a third station and a fourth station, wherein the second request message is used to request to measure a channel quality in a communications beam direction in a second SP, the first SP is at least used by the third station to communicate with the fourth station, and the second SP is at least used by the first station and the second station to perform wireless local area network WLAN sensing; and separately receive a first measurement result from the first station, the second station, the third station, and the fourth station; and
a processor, configured to determine, based on the first measurement result, whether to perform spatial multiplexing on the first SP and the second SP.

13. The apparatus according to claim 12, wherein the first SP is further used by the third station to communicate with the fourth station, and the first request message is further used to request to measure a channel quality in a communications beam direction in the first SP.

14. The apparatus according to claim 13, wherein the first request message comprises a first field, and a value of the first field is a reserved value indicating to measure the channel qualities in both the sensing beam direction and the communications beam direction.

15. The apparatus according to claim 12, wherein the first request message comprises at least one of a second field and a third field, the second field indicates to measure a channel quality in all sensing beam directions to produce measurement results for all sensing beam directions or measure a channel quality in a specified sensing beam direction to produce the first measurement result, and the third field indicates to feed back all values, an average value, a maximum value, or a minimum value of the measurement results for all sensing beam directions or the specified sensing beam direction.

16. The apparatus according to claim 15, wherein the second field indicates to measure the channel quality in the specified sensing beam direction, the first request message further comprises a fourth field that indicates the specified sensing beam.

17. The apparatus according to claim 12, wherein the first measurement result fed back by the first station and the second station comprises a fifth field that indicates a measurement result in each of the one or more sensing beam directions or the specified sensing beam direction, or an average value, a maximum value, or a minimum value of measurement results in the one or more sensing beam directions or the specified sensing beam direction.

18. The apparatus according to claim 12, wherein the transceiver is further configured to:
send a first message, wherein the first message indicates to perform spatial multiplexing on the first SP and the second SP.

19. A chip, comprising:
a processor and an interface, configured to invoke a computer program stored in a memory, and run the computer program to perform a method:
receiving, a first request message from an access point, wherein the first request message is used to request to measure a channel quality in one or more sensing beam directions in a first service period (SP); and
performing, measurement in the one or more sensing beam directions in the first SP based on the first request message, to obtain a first measurement result, wherein the first SP is an SP of at least one operation of communication and wireless local area network (WLAN) sensing performed by a third station and a fourth station, and
sending, the first measurement result to the access point.

20. A chip, comprising:
a processor and an interface, configured to invoke a computer program stored in a memory, and run the computer program to perform a method:
sending, a first request message to a first station and a second station, wherein the first request message is used to request to measure a channel quality in one or more sensing beam directions in a first service period SP; send a second request message to a third station and a fourth station, wherein the second request message is used to request to measure a channel quality in a communications beam direction in a second SP, the first SP is at least used by the third station to communicate with the fourth station, and the second SP is at least used by the first station and the second station to perform wireless local area network WLAN sensing; and separately receive a first measurement result from the first station, the second station, the third station, and the fourth station; and
determining, based on the first measurement result, whether to perform spatial multiplexing on the first SP and the second SP.

* * * * *